United States Patent
Atsumi et al.

[11] Patent Number: 5,949,388
[45] Date of Patent: Sep. 7, 1999

[54] HEAD-MOUNTED VIDEO DISPLAY

[75] Inventors: Motohiro Atsumi; Yoshihiro Maeda, both of Tokyo, Japan

[73] Assignee: Olympus Optical Co., Ltd., Tokyo, Japan

[21] Appl. No.: 08/610,289

[22] Filed: Mar. 4, 1996

[30] Foreign Application Priority Data

| Mar. 3, 1995 | [JP] | Japan | 7-043877 |
| Mar. 7, 1995 | [JP] | Japan | 7-046874 |
| Mar. 10, 1995 | [JP] | Japan | 7-050998 |

[51] Int. Cl.$^6$ .................................................. G09G 5/00
[52] U.S. Cl. ........................................ 345/8; 345/53
[58] Field of Search ............................. 345/8; 348/53

[56] References Cited

U.S. PATENT DOCUMENTS

| 4,636,866 | 1/1987 | Hattori | 345/8 |
| 4,755,023 | 7/1988 | Evans et al. | 350/174 |
| 4,807,987 | 2/1989 | Bastable . | |
| 4,961,626 | 10/1990 | Fournier, Jr. et al. | 350/174 |
| 5,185,561 | 2/1993 | Good et al. | 318/432 |
| 5,281,957 | 1/1994 | Schoolman | 345/8 |
| 5,305,098 | 4/1994 | Matsunaka et al. | 348/65 |
| 5,321,416 | 6/1994 | Bassett et al. | 345/8 |
| 5,485,172 | 1/1996 | Sawachika et al. | 345/8 |
| 5,486,841 | 1/1996 | Hara et al. | 345/8 |
| 5,539,422 | 7/1996 | Heacock et al. | 345/8 |
| 5,543,816 | 8/1996 | Heacock | 345/8 |
| 5,546,099 | 8/1996 | Quint et al. | 345/8 |
| 5,579,026 | 11/1996 | Tabata | 345/8 |
| 5,767,820 | 6/1998 | Bassett et al. | 345/8 |

FOREIGN PATENT DOCUMENTS

| 3-101709 | 4/1991 | Japan . |
| 3-189677 | 8/1991 | Japan . |
| 4-22358 | 1/1992 | Japan . |
| 5-244539 | 9/1993 | Japan . |
| 5-342824 | 12/1993 | Japan . |

*Primary Examiner*—Mark R. Powell
*Assistant Examiner*—Vincent E. Kovalick
*Attorney, Agent, or Firm*—Pillsbury Madison & Sutro LLP

[57] ABSTRACT

A display body (1) is capable of being mounted via a support frame (3) having band pieces (2) on the head of a doctor, for instance a surgeon. The display body (1) has cylindrical grips (4) projecting from its opposite sides. The grips (4) are attached to and detached from the display body (1). The grips (4) are cylindrical in shape.

7 Claims, 33 Drawing Sheets

HEAD-MOUNTED VIDEO DISPLAY

BACKGROUND OF THE INVENTION

The present invention relates to head-mounted video displays and more particularly to head-mounted video display capable of being mounted on the surgeon's head for use as a viewing system for endoscopic surgical procedures.

A head-mounted video display is well known in the art, which is capable of being mounted on the head of an viewer (who wears the display) with an optical system, a video display system, etc., in proper position before the eyes of the viewer, to provide images to the eyes of the viewer. Such a display system has a variety of potential applications.

For example, Japanese Laid-Open Patent Application No. 3-101709 (Literature 1) and Japanese Laid-Open Patent Application No. 3-189677 (Literature 2) disclose helmet systems and helmet-mounted video displays for aircraft crews. The disclosed systems permit viewing electronic subject video and the neighborhood field at the same time. The electronic subject video and neighborhood field are superimposed on each other using a superimposing (combining) unit.

The head-mounted video display (called "HMD") has a display body of goggle type or binocular type, which is capable of being mounted on the head to receive video and audio data transmitted via a cable. This system is attracting attention particularly of the younger generation as a system for enjoying stereo pictures and stereo sounds either indoors or outdoors. Recently, the system is finding applications for surgical purposes: it is worn by a doctor in a surgical site for obtaining video data concerning the surgery and surgical locality of the patient which can not be obtained by observation with the naked eyes. The system can also be switched for observation with the naked eyes, i.e., see-through observation. The present invention especially concerns head-mounted video displays used in the medical field.

For surgery in the surgical room, the doctor should not only sterilize his or her hands but also should not touch what is not sterilized. The doctor, therefore, can not touch the display with his or her hands and has to let an assistant mount the display. However, it has been difficult to let the assistant mount the display to be worn quickly and properly.

The present invention seeks to overcome the above drawbacks, and it has an object of providing a head-mounted video display which permits the user to wear it with his or her own sterilized hands.

As an example, it is conceivable to utilize the head-mounted video display as a surgical electronic subject video monitor using an endoscope having a television camera provided at an end. In this case, with a prior art system where the near-by picture video is superimposed on the electronic subject video, viewing of the details of the surgical site may be difficult because of the interference with neighborhood field. FIG. 33 is a view illustrating this viewpoint, specifically a view showing a case in which the electronic subject video and neighborhood field are superimposed on each other on the head-mounted video display used as a surgical monitor with the purpose of observation by the surgeon. In this case, the surgeon's hands are displayed along with the endoscope and a guide sheath (pierced into the patient's body) thereof and also with a surgical tool and a guide sheath thereof.

This arrangement permits prevention of blood or the like splattering from the surgical site onto the surgeon, thus preventing disease. With the prior art system, however, the electronic subject video picture can not be observed while wearing goggles. That is, it is difficult to protect the eyes and the neighborhood thereof, which is insufficient to provide protection against splattered matter or like external foreign matter.

In view of the above considerations, the present invention seeks to provide a head-mounted video display which permits viewing electronic subject video and the neighborhood field without superimposition thereof and also can appropriately prevent foreign matter from coming through the clearance space between the body of the display and the face of the user wearing it.

The present invention further seeks to provide a head-mounted video display, which, while permitting viewing an electronic subject video picture and a neighborhood field picture without superimposing these pictures, can appropriately guard the face of the wearer, i.e., the surgeon, without wearing any goggles by preventing blood or like matter splattered from the surgical site from being attached to the wearer, so that it is suitable for being worn by the surgeon for surgery or the like.

The present invention still further seeks to provide improvements of such head-mounted video displays.

The doctor wearing the head-mounted video display for medical purpose may view his or her neighborhood from the periphery of the display. That is, the doctor may view the motion of near-by persons or data displayed on various units during the surgical procedures.

In a lenghty, multi-hour surgical procedure, the surgeon views a magnifier as a video display element by holding the line of sight in a horizontal direction.

In the head-mounted video display noted above, the electronic subject video display member is mounted on separate opposite side optical system holders. These optical system holders are coupled together by a coupling member, and mounted on a support member.

In the prior art example of the head-mounted video display as described, however, the support member is disposed such that it greatly blocks the doctor's line of sight (as shown in, for instance, Japanese Laid-Open Patent Publication No. 6-133253). Therefore, the field of view of the doctor, intending to view the neighborhood through the periphery of the head-mounted video display that is worn, is blocked by the support member of the display, and the doctor can not visually recognize motion of a person or data displayed on various units in the neighborhood.

Another drawback in the above prior art example is that the video picture display member is viewed for a long time while holding the pupils in a horizontal direction, eventually resulting in fatigue.

A further drawback in the prior art example is that since the electronic subject video picture display member is mounted on separate opposite side holding members (as shown in, for instance, Japanese Laid-Open Patent Publication No. 3-214872), the holding members may frequently fail to be mounted properly, thus resulting in deviation of the displayed video picture. A still further drawback is the inconvenience due to an increased number of components of the display.

The present invention seeks to overcome the above drawbacks, and it has an object of providing a head-mounted video display which permits observation of the neighborhood of the viewer wearing it through its periphery, also a head-mounted video display which permits less accumulation of fatigue by viewing the video picture display member for a long time, and further a head-mounted video display which is free from deviation of the video picture due to improper mounting of the opposite side holding members, while permitting reduction of the number of components.

SUMMARY OF THE INVENTION

According to a first aspect of the present invention, there is provided a head-mounted video display, in which at least a body including a video display means is capable of being mounted via mounting means on the head, the body having knobs provided detachably on the opposite sides.

According to a second aspect of the present invention, there is provided a head-mounted video display, in which at least a body including a video display means is capable of being mounted via mounting means on the head, the body having knobs provided on the opposite sides, a cover being provided detachably on each of the knobs.

According to a third aspect of the present invention, there is provided a head-mounted video display in which at least a body including a video display means is capable of being mounted via mounting means on the head, the body having knobs provided detachably on the opposite sides.

According to a fourth aspect of the present invention, there is provided a head-mounted video, in which at least a body including a video display means is capable of being mounted via mounting means on the head, the body having knobs provided on the opposite sides, and a cover being provided detachably on each of the knobs.

According to a fifth aspect of the present invention, there is provided a head-mounted video in which at least a body including a video display means is capable of being mounted via mounting means on the head, the body having a grip provided detachably on one side and another grip provided detachably on the other side and asymmetrically with the first-mentioned grip.

According to a sixth aspect of the present invention, there is provided a head-mounted video in which at least a body including a video display means is capable of being mounted via mounting means on the head, the body having a grip provided detachably on the front or on the top.

According to a seventh aspect of the present invention, there is provided a head-mounted video in which at least a body including a video display means is capable of being mounted via mounting means on the head, wherein the mounting means has a grip extending from the opposite sides such as to surround the body and rotatable about the opposite sides.

According to an eighth aspect of the present invention, there is provided a head-mounted video in which at least a body including video display means is capable of being mounted via mounting means on the head, the body having grips provided detachably on the top and having an interpupillary distance adjusting function, the mounting means having grips provided on the opposite sides and having tightening adjusting means.

According to a ninth aspect of the present invention, there is provided a head-mounted video comprising an electronic video display unit for projecting an electronic video image as a virtual image onto the pupils of the viewer, external light shielding means for shielding external light led from the electronic video display unit in the direction of arrival of the virtual image, and a transparent guard for transmitting external light beneath the virtual image led from the electronic video display unit to be led to the pupils.

According to a tenth aspect of the present invention, there is provided a head-mounted video which comprises a member for preventing electronic subject video from being directly interfered with by external light, wherein a transparent guard is provided such as to extend into the clearance space between the body of the head-mounted video display and the face of the viewer.

According to an eleventh aspect of the present invention, there is provided a head-mounted video comprising an electronic video display unit for projecting an electronic video image as a virtual image onto the pupils of the viewer, external light shielding means for shielding external light led from the electronic video display unit in the direction of arrival of the virtual image, and a transparent guard for transmitting external light beneath the virtual image led from the electronic video display unit to be led to the pupils.

According to a twelfth aspect of the present invention, there is provided a head-mounted video comprising a body including a left eye video display element for displaying video led to the left eye of the viewer and a right eye video display element for displaying video led to the right eye of the viewer, and mounting means connected to the body for mounting the body on the head of the viewer, the body further including a frame member for securing the left and right video display elements thereto, an outer member of the body facing the eyes of the viewer being partly formed with inclined portions or chamfers permitting observation of the neighborhood field.

According to a thirteenth aspect of the present invention, there is provided a head-mounted video comprising a body including a left eye video display element for displaying video led to the left eye of the viewer and a right eye video display element for displaying video led to the right eye of the viewer, and mounting means connected to the body for mounting the body on the head of the viewer, wherein: video enlargement optical elements constituting video display means and viewed directly by the viewer are disposed at a downward angle of 3 to 10 degrees from the horizontal.

According to a fourteenth aspect of the present invention, there is provided a head-mounted video comprising a body including a left eye video display element for displaying video led to the left eye of the viewer and a right eye video display element for displaying video led to the right eye of the viewer, and mounting means connected to the body for mounting the body on the head of the viewer, the head-mounted video display further comprising: a frame member having electronic video display element holding parts, on which the left and right electronic video display elements constituting video display means are disposed, and optical system holding parts, to which left and right optical system holding members corresponding to the electronic video display element holding parts are secured, the frame member being secured to an outer member.

According to a fifteenth aspect of the present invention, there is provided a head-mounted video comprising a body including a left eye video display element for displaying video led to the left eye of the viewer and a right eye video display element for displaying video led to the right eye of the viewer, and mounting means connected to the body for mounting the body on the head of the viewer, the body further including a frame member with the left and right video display elements being secured thereto, an outer member of the body facing the eyes of the viewer being formed with inclined portions or chamfers permitting observation of the neighborhood field.

According to a sixteenth aspect of the present invention, there is provided a head-mounted video comprising a body including a left eye video display element for displaying video led to the left eye of the viewer and a right eye video led to the right eye of the viewer, and mounting means connected to the body for mounting the body on the head of the viewer, the head-mounted video display further comprising a frame member having electronic video display holding parts, on which the left and right video display elements constituting video display means are disposed, and optical system holding parts, to which left and right optical system holding members corresponding to the electronic video display element holding parts are secured, the frame member being secured to an outer member.

Other objects and features will be clarified from the following description with reference to attached drawings.

BRIEF DESCRIPTION OF THE DRAWINGS

FIG. 5 is a front view of the display body 1 in the state shown in FIG. 4;

FIGS. 10 to 12A and 12B show a tightening adjustment mechanism in the sixth embodiment;

FIGS. 12A and 12B show the manner of control of rotation and stop of the second gear 9a with the operation of the grip 8d;

FIG. 25 shows the head-mounted video display in the normal position (for viewing the electronic subject video);

FIG. 26 shows the display with the display body kicked up;

FIGS. 27 and 28 show a different example of head-mounted video display 10, in which the transparent member 20 is slidable vertically relative to the display body 11, FIG. 27 representing the display 10 worn by the user, and FIG. 28 representing the display 10 put on a table or the like;

PREFERRED EMBODIMENTS OF THE INVENTION

Figure 1:
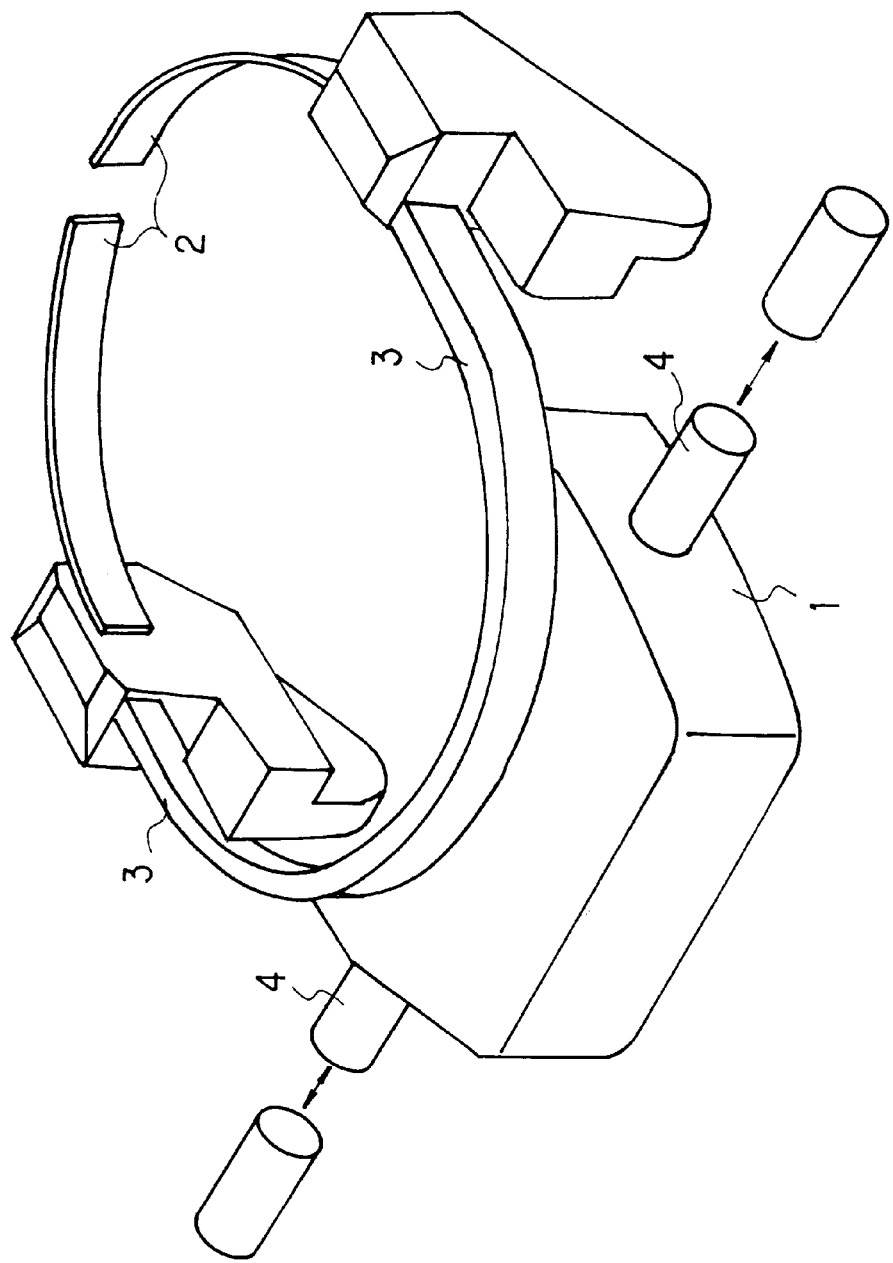
FIG. 1 shows, in a perspective view, a first embodiment of the present invention.

Embodiments of the present invention will now be described with reference to the drawings. FIG. 1 shows, in a perspective view, a first embodiment of the present invention.

A display body 1 is shown in FIG. 1, which is capable of being mounted via a support frame 3 having band pieces 2 on the head of a surgeon, for instance a doctor. The display body 1 has cylindrical grips 4 projecting from its opposite sides. The grips 4 can be attached to and detached from the display body 1. The grips 4 are preferably cylindrical in shape, but this is not a limitation of the invention; they may have any other shape as well, such as an oval sectional profile shape, a polygonal sectional profile shape, etc. This is so as well in the other embodiments described hereinunder.

The grips 4 are made of aluminum, stainless steel, titanium, silicone rubber, polyacetal, linole, etc., and can be readily sterilized by thermal sterilization, gas sterilization, etc.

The surgeon thus can mount the head-mounted video display by setting the display in a desired position by gripping the sterilized grips 4 with sterilized hands and without the need for a hand by an assistant. The assistant may assist the mounting of the display. In this case, the assistant's hand which touches an object other than the grip 4 may not be sterilized.

While the head-mounted video display thus can be mounted quickly and in a proper position, the grips 4 which are capable of being attached and detached, may be discarded after use, or in some cases they may be re-used after sterilization. The head-mounted video display may not be entirely sterilized, and it may be put in any locality in the surgery room. The head-mounted display may not be of sterilization-resistant specifications, thus permitting reduction of production cost and weight reduction.

Figure 2:
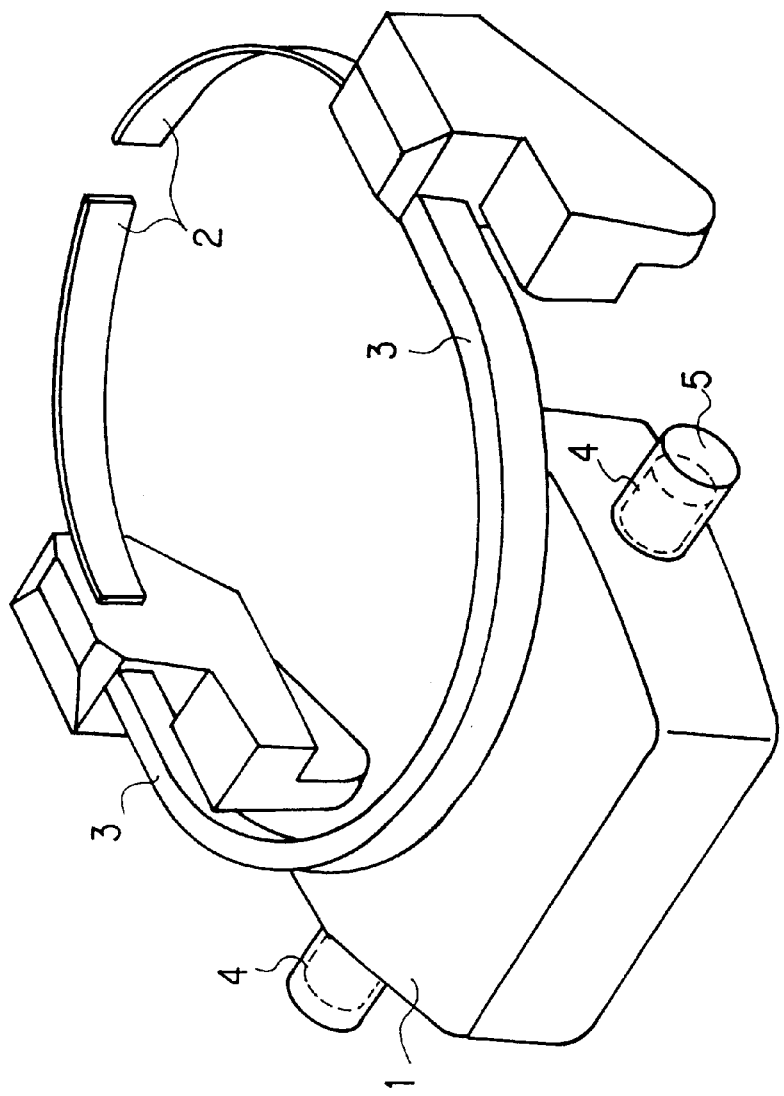
FIG. 2 shows a second embodiment of the present invention.

FIG. 2 shows a second embodiment of the present invention, and uses like reference numerals to designate parts corresponding to those in the preceding first embodiment. This is so in the other embodiments described hereinunder.

In this embodiment, the grips 4 in the first embodiment are fixed to the display body 1, and covers 5 are detachably provided on the grips 4. The covers 5 are sterilized when mounting them. The surgeon thus can mount the head-mounted video display by putting his or her display on the head by gripping the grips 4 over the sterilized covers 5 thereof. The display thus can be set at the desired position without help by any assistant. Like the first embodiment, an assistant may assist the mounting of the display, and in this case the hand of the assistant which touches an object other than the cover 5 may not be sterilized.

While the head-mounted video display thus can be mounted quickly and in a proper position, the covers 5 which are capable of being attached and detached, may be discarded after use, or in some cases they may be re-used after sterilization. The head-mounted video display may not be entirely sterilized, and it may be put in any locality in the surgery room. The head-mounted display may not be of sterilization-resistant specifications, thus permitting reduction of production cost and weight reduction. Similar material may be employed for the cover 5.

Figure 3:
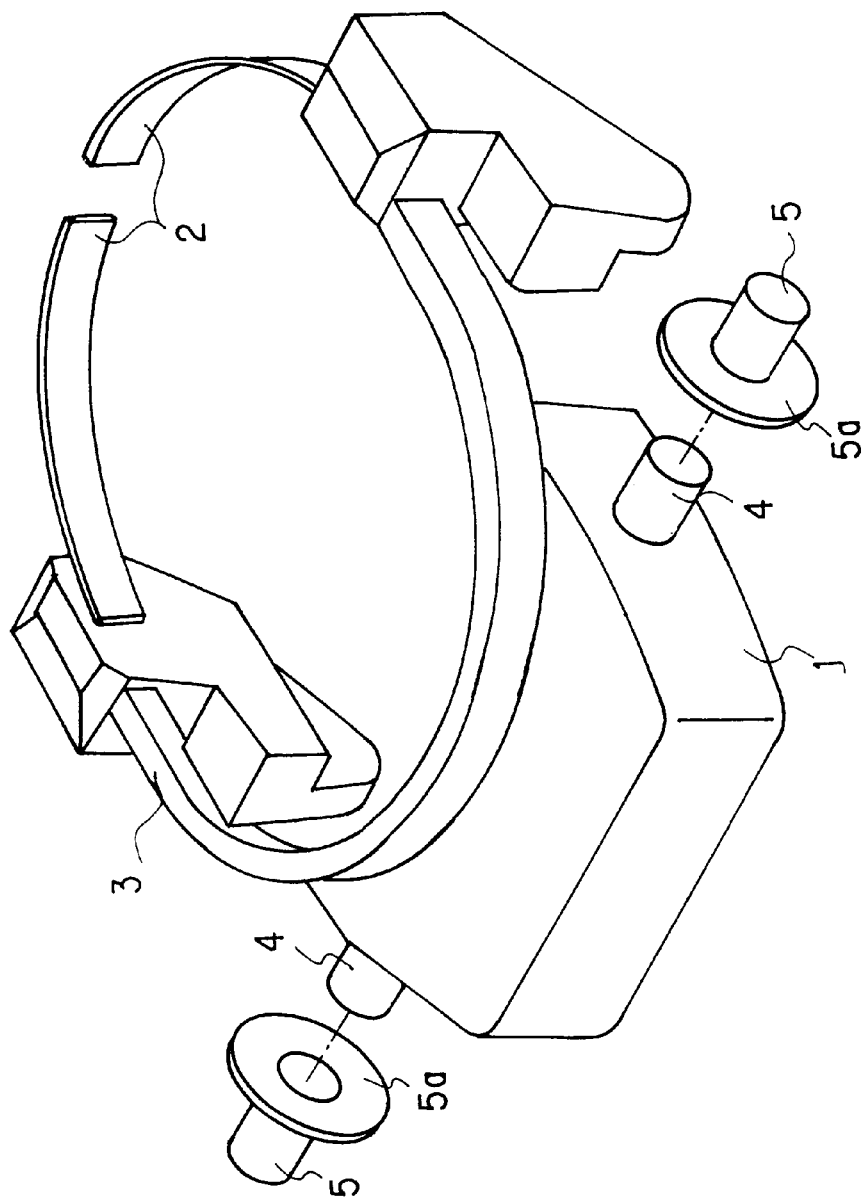
FIG. 3 shows a modification of the second embodiment.

FIG. 3 shows a modification of the second embodiment. In this case, each cover 5 shown in the second embodiment has an integral auxiliary cover part 5a provided at its stem. Specifically, the auxiliary cover part 5a, integral with the stem of the cover 5, is flange-like. The auxiliary cover part 5a is of course formed such that it is capable of sterilization. The remainder of the structure is the same as in the second embodiment.

When the surgeon grips the grips 4 over the covers 5, the auxiliary cover parts 5a prevent occasional touching of the non-sterilized display body 1 near the covers 5. In addition to this effect, the same effects as in the second embodiment are obtainable as well.

It is possible to provide auxiliary cover parts such that they are integral with the detachable grips in the first embodiment. In this case, the steps of the grips should of course be detachable from the display body even with the provision of the auxiliary cover parts.

Figure 4:
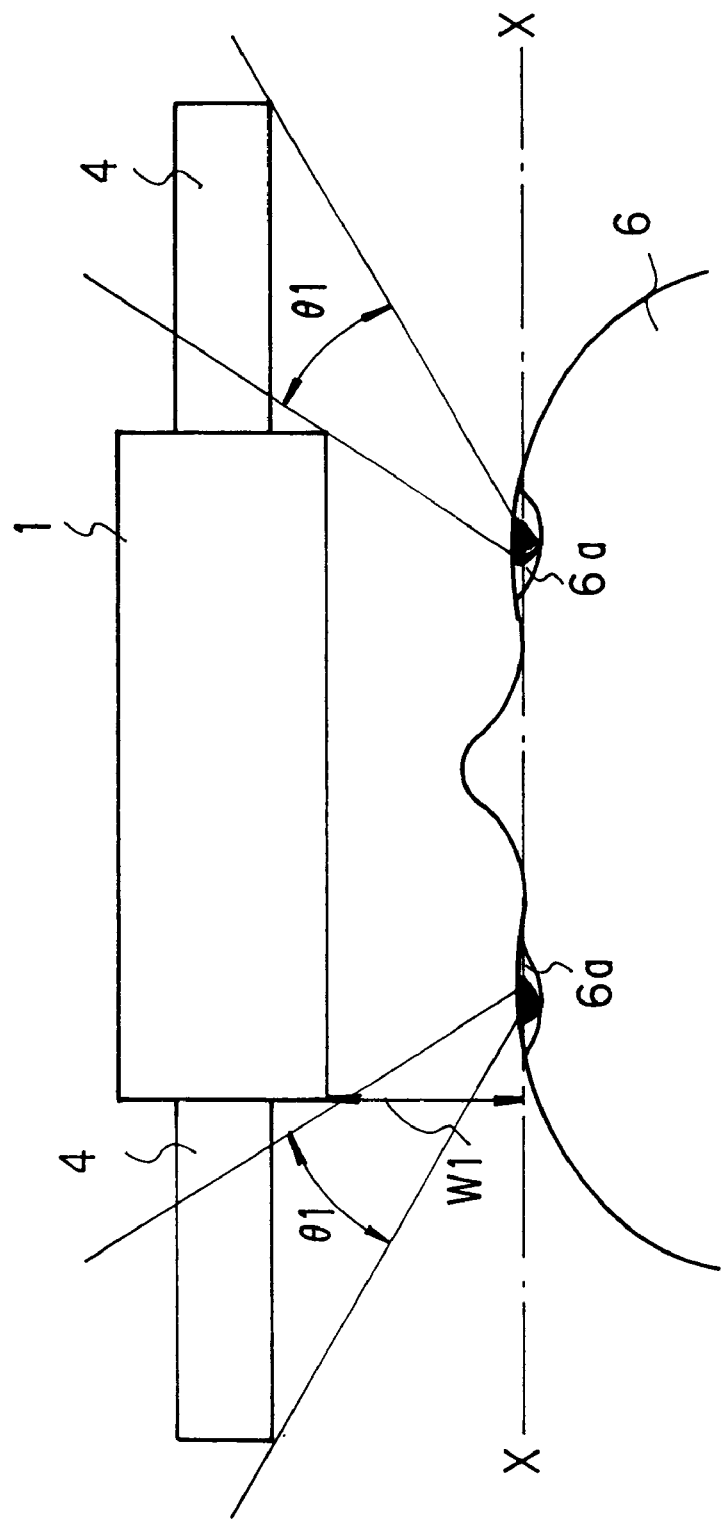
FIGS. 4 and 5 show the adequate position, at which the grips or grips with covers are provided on the display body 1.
Figure 5:
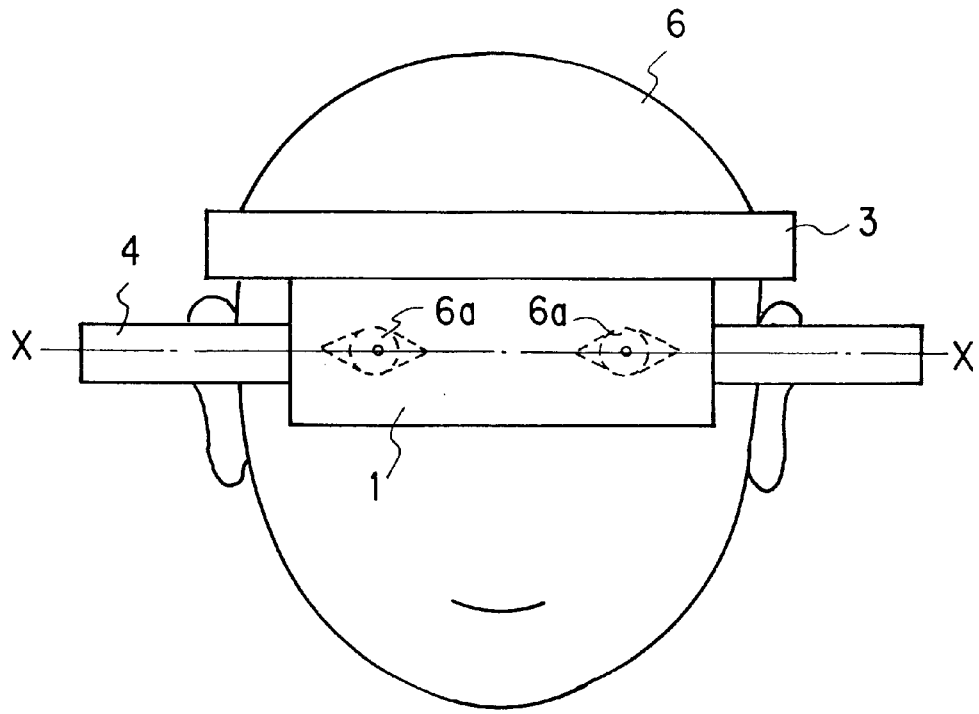

FIGS. 4 and 5 show the adequate position, at which the grips or grips with covers are provided on the display body 1.

The grips or grips with covers have to be provided on the head-mounted video display at a position thereof that they can be seen from the surgeon when the display is mounted on the surgeon with a space provided between the surgeon's face and the display. In other words, the surgeon should be able to grip the grips or grips with covers quickly and reliably without the need for groping therefor. In addition, it is necessary to prevent the surgeon from touching a non-sterilized part of the head-mounted video display while groping for the grips or grips with covers.

In the illustration of FIG. 4, the grips 4 provided on the opposite sides of the display body 1 are located in the range of sight field angle 1 of the eyes 6a of the surgeon 6 with the display body 1 spaced apart by a distance W1 from the eyes 6a of the surgeon 6, so that the surgeon 6 can see the grips 4 before the eyes 6a. Shown at X is the line connecting the eyes 6a of the surgeon 6.

FIG. 5 is a front view of the display body 1 in the state shown in FIG. 4.

Figure 6:
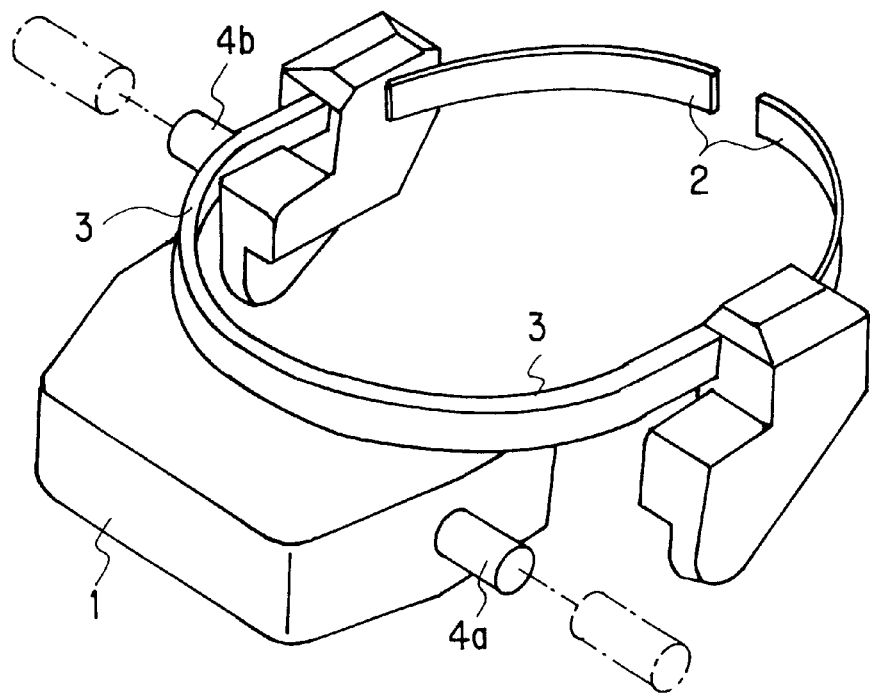
FIG. 6 shows a third embodiment of the present invention.

FIG. 6 shows a third embodiment of the present invention. In this embodiment, one of the two grips is provided on one side of the display body 1, while the other grip is provided on the other side of the support frame 3. Like the first embodiment, the grip 4a provided on the head-mounted video display 1 and the grip 4b provided on the support frame 3 are both detachable. In the remainder of the structure, this embodiment is the same as the first embodiment.

With this structure, the surgeon can hold the head-mounted video display by himself or herself with two hands staggered in the forward/rearward direction. The head-mounted video display thus can be held in a well-balanced stable way. In addition, when an assistant assists the mounting of the head-mounted video display, the display can be held without the surgeon and the assistant interfering each other. At any rate, the structure permits stable mounting operation with the weight of the display in a well-balanced state. In addition to this effect, the same effects as those of the first embodiment are obtainable as well.

It is again possible that the grips may not be detachable, and that the grips are covered by sterilized covers as in the second embodiment and the modification thereof.

Figure 7A:
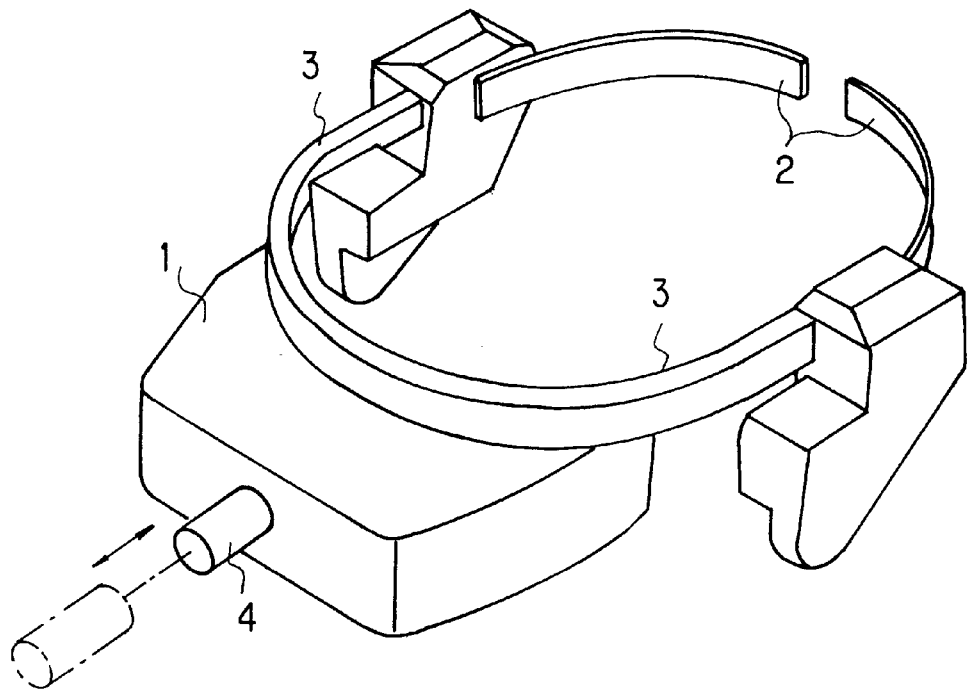
FIGS. 7A and 7B show a fourth embodiment of the present invention.
Figure 7B:
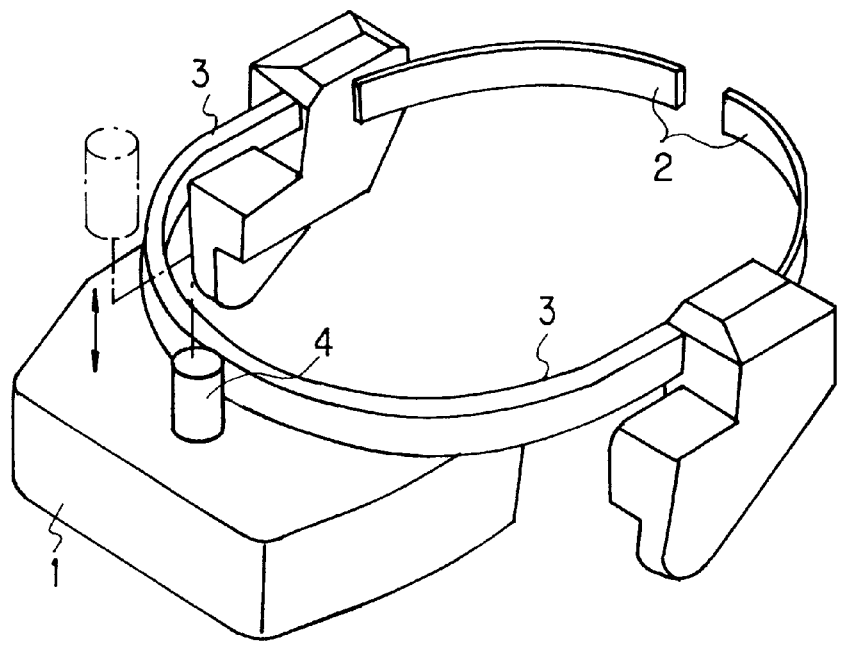

FIGS. 7A and 7B show a fourth embodiment of the present invention. In this embodiment, the single grip 4 is provided detachably on the display body 1. In the case of FIG. 7A, the grip 4 is provided on the front face of the display body 1. In the case of FIG. 7B, the grip 4 is provided on the top of the display body 1.

The grip 4 has to be provided at a position that it can be gripped with a single hand in a well-balanced state of the display body 1 when holding the body 1. With this arrangement, it is possible to minimize the weight of the head-mounted video display. In addition to this effect, the same effects as those of the first embodiment are obtainable as well.

The grip may not be detachable, but it may be fixed and covered with a sterilized cover as in the second embodiment and the modification thereof.

Figure 8:
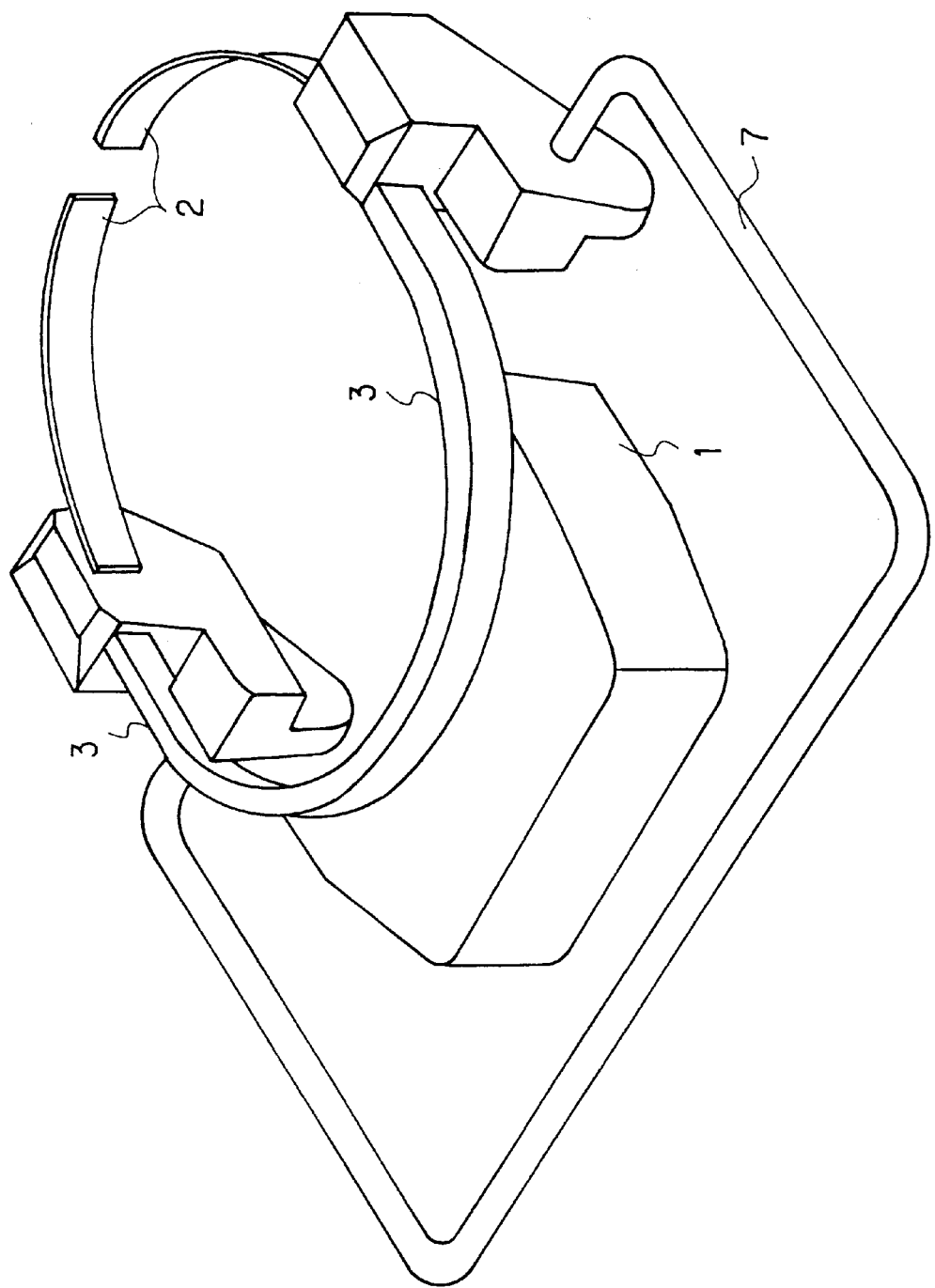
FIG. 8 shows a fifth embodiment of the present invention.

FIG. 8 shows a fifth embodiment of the present invention. In this embodiment, a substantially channel-shaped arm 7 extends from the opposite sides of the support frame 3 such as to surround the display body 1. The arm 7 is detachable from the support arm 3 and, when attached to the same, can be rotated and brought to a position free from interference of the use of the head-mounted video display.

The arm 7 may be made of such material as aluminum, stainless steel, titanium, silicone rubber, polyacetal, linole, etc. For the remainder of the structure, the embodiment is the same as the first embodiment.

Since the arm 7 is large, the head-mounted video display can be held in a well-balanced state, so that it can be readily mounted. The head-mounted video display can be mounted by taking hold of the large arm 7 at a desired position thereof, and thus it can be mounted with either a single hand or both hands. In addition to this effect, the same effects as those in the first embodiment are obtainable as well.

Figure 9:
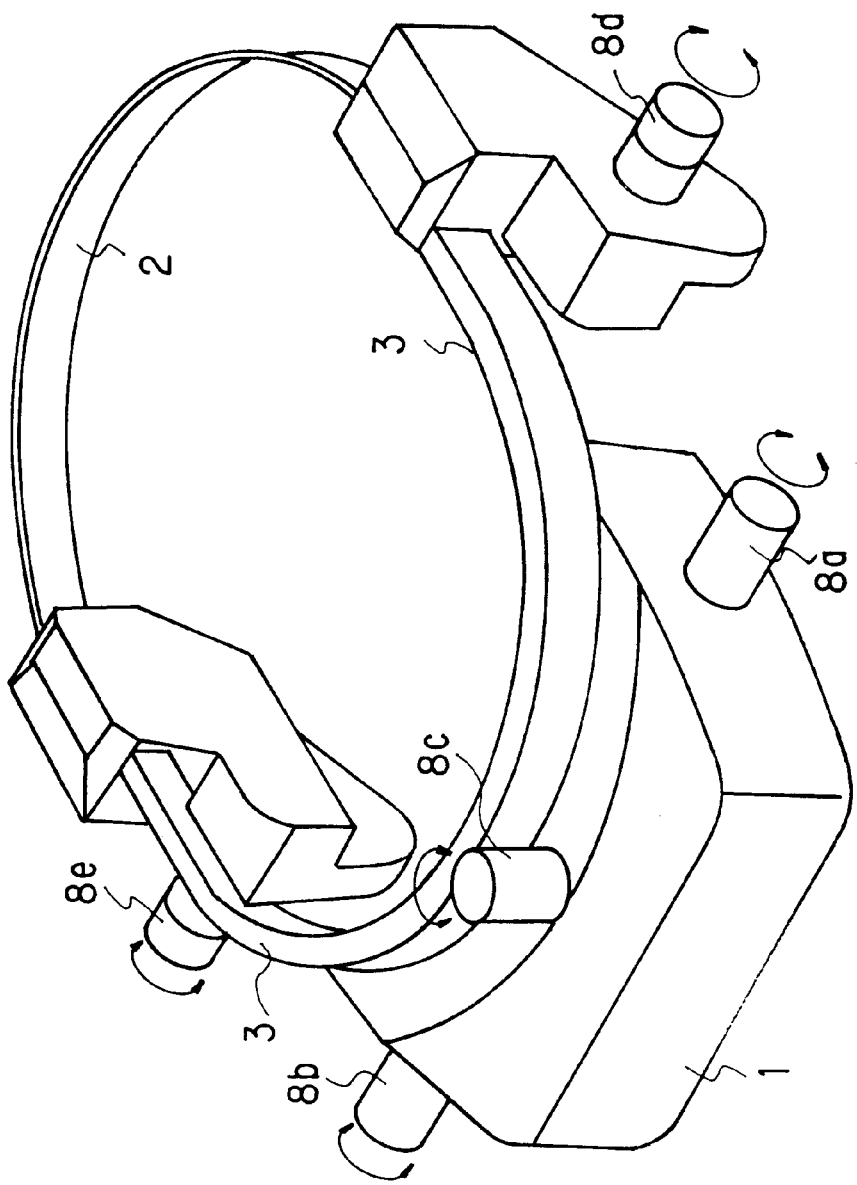
FIG. 9 shows a sixth embodiment of the present invention.

FIG. 9 shows a sixth embodiment of the present invention. In this embodiment, grips having various adjusting functions are provided on various parts of the display body 1. Specifically, detachable grips 8a and 8b having a sight field adjusting function, are provided on the opposite sides of the display body 1. A further grip 8c which has an interpupillary distance adjusting function, is provided on top of the display body 1. Further detachable grips 8d and 8e which have a tightening function, are provided on the opposite sides of the support frame 3.

While these grips 8a to 8e are shown to be cylindrical, this is not limitative, and it is possible to select any shape of the grips that permits ready gripping and ready adjustment. The adjustment may be permitted by rotating the grips in the directions of arrows as shown, or it may be caused by button operation or by any other way.

With this arrangement, the surgeon can make the sight field adjustment, interpupillary distance adjustment and tightening adjustment with respect to his or her head as desired after mounting the head-mounted video display on his or her head with sterilized hands. The surgeon thus can mount the head-mounted video display in a proper position for use in the surgery room while ensuring the sterilized state of his or her hands. For the remainder of the structure and the other effects, the embodiment is the same as the first embodiment.

FIGS. 10 to 12A and 12B show a tightening adjustment mechanism in the sixth embodiment. The mechanism includes a tightening band 2 which is U-shaped in plan view. The band 2 has longitudinally elongate slots 2a, each formed adjacent to each end of it, and each slot 2a has a first gear 9, as shown in the side view of FIG. 9.

A second gear 9a (or 9b) which is rotatable coaxially with the grip 8d (or 8e) is in mesh with the first gear 9. The band 2 can be displaced in the directions of arrows with the rotation of the second gear 9a (or 9b).

Figure 12A:
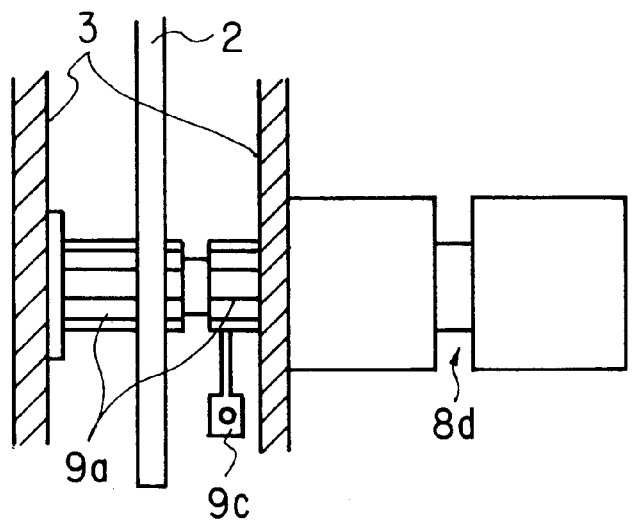
Figure 12B:
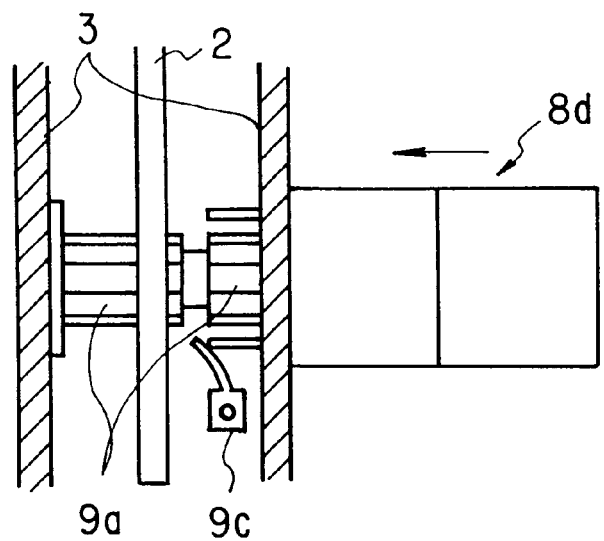

FIGS. 12A and 12B show the manner of control of rotation and stop of the second gear 9a with the operation of the grip 8d. As shown in FIG. 12A, the grip 8d comprises two divisions which are usually spaced apart. The second gear 9a is held stationary by engagement of a ratchet 9c with it.

By pushing the grip 8d in the direction of the arrow in FIG. 12B, the divisions which have been spaced apart are brought into contact with each other, and release pawls 12 are projected to disengage the ratchet 11a from the second gear 9a to permit rotation thereof. The same operation applies to the other grip 8e (see FIG. 10).

Figure 10:
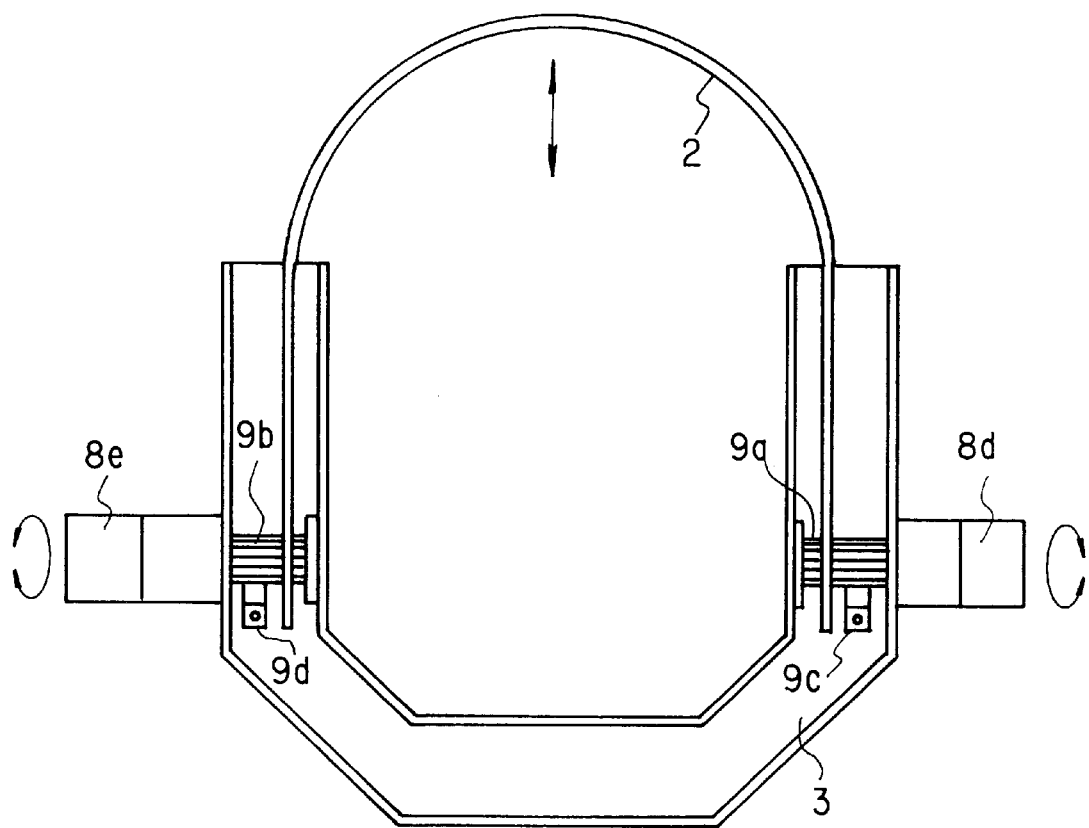
Figure 11:
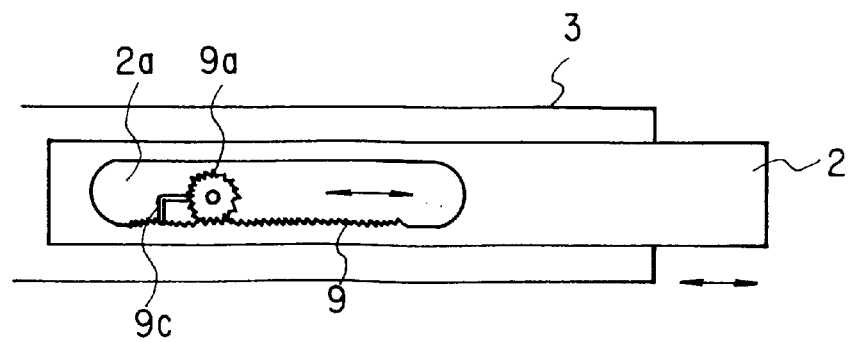

With this arrangement, when making tightening adjustment of the band 2 with respect to the surgeon's head, the ratchet 9c (or 9d) is disengaged from the second gear 9a (or 9b) by pushing the grip 8d (or 8e) as shown in FIG. 12B, and then band 2 is displaced in the directions of arrows in FIG. 10 by turning the grip 8d (or 8e) in circumferential directions. This effects the tightening adjustment of the band 2 with respect to the surgeon's head.

When the adjustment is made, the grip 8d (or 8e) is pulled outward as shown in FIG. 12A. As a result, the release pawls 12 are retreated to cause engagement of the ratchet 9c (or 9d) with the second gear 9a again, and thus the adjusted state can be maintained. Reliable tightening adjustment thus is obtainable by causing advancement and retreat of the band 2 from and into the support frame 3 with a simple structure.

According to the present invention, the surgeon can mount the head-mounted video display by putting the display on the head at a desired position thereof by gripping the sterilized grips with the sterilized hands. Since the grips are detachable, they may be discarded after use, or in some cases they may be re-used after sterilizing them. The head-mounted video display may not be entirely sterilized, and it may be put in any locality in the surgery room. The head-mounted video display may not be of sterilization-resistant specifications, thus permitting reduction of production cost and weight reduction. The covers are mounted after sterilization on the grips, and the surgeon can mount the head-mounted video display on his or her head by putting the display on his or her head at a desired position thereof by gripping the grips over the sterilized covers with sterilized hands. Since the covers are detachable, they may be discarded after use, or in some cases they may be re-used after sterilization. Since the grips or grips with covers are at positions such that they can be viewed by the wearer, i.e., the surgeon, the grips or grips with covers can be gripped quickly and reliably without being groped for, and this can eliminate the possibility of occasional touching of a non-sterilized part of the head-mounted display.

Figure 13:
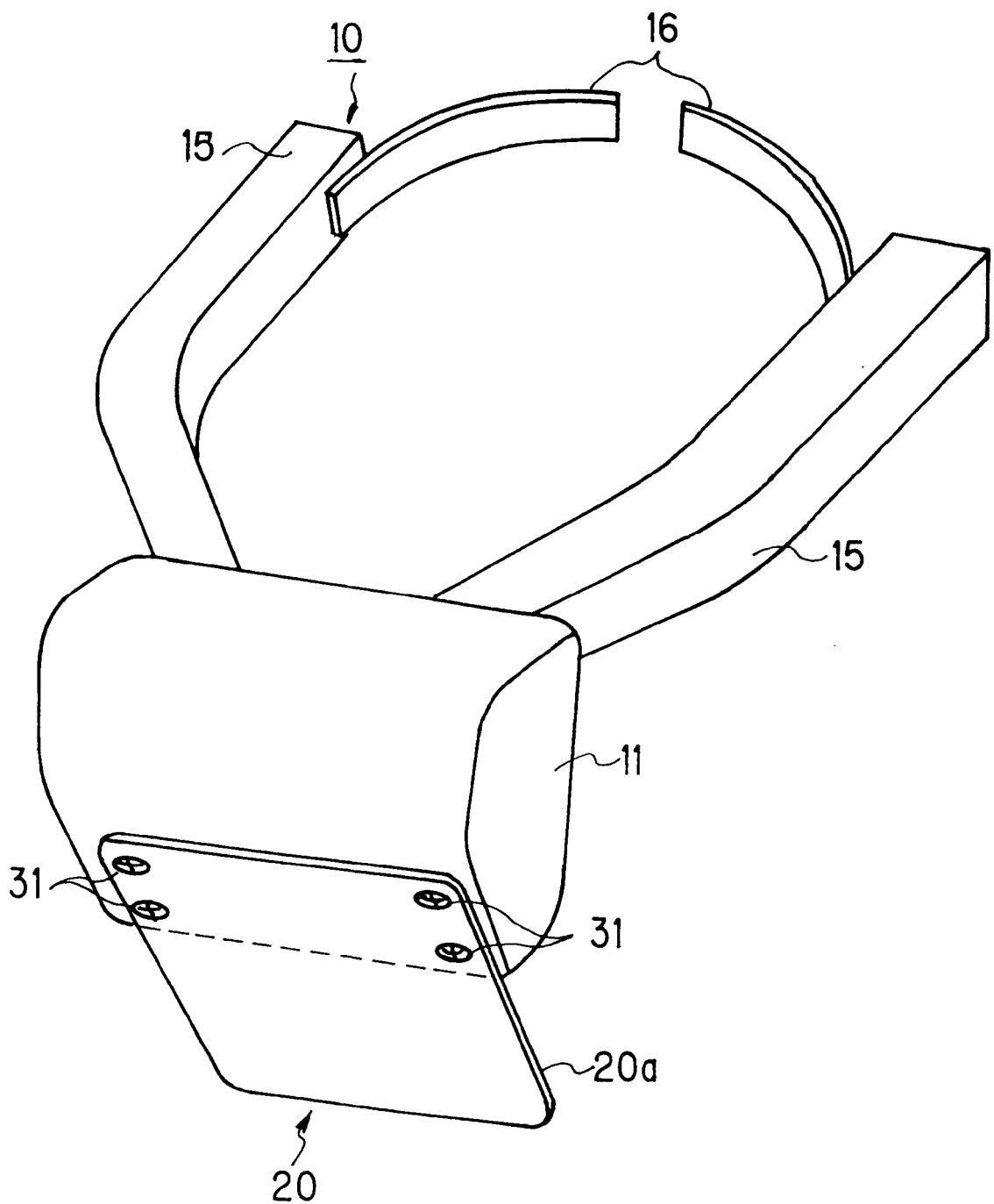
FIG. 13 shows, in perspective, a seventh embodiment of the head-mounted video display according to the present invention.
Figure 14:
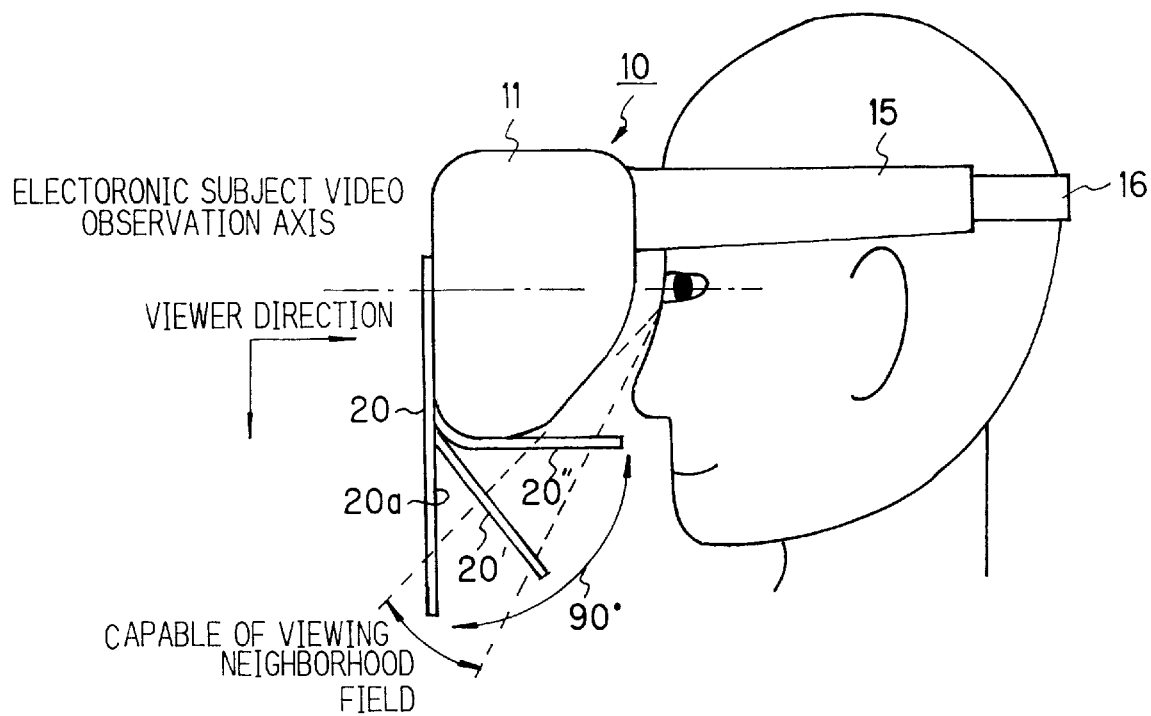
FIG. 14 shows the display in a state of use that it is mounted on the viewer (i.e., user), and it also serves for describing the position of mounting of a transparent guard.

FIG. 13 shows, in perspective, a seventh embodiment of the head-mounted video display according to the present invention. FIG. 14 shows the display in a state of use that it is mounted on the viewer (i.e., user), and it also serves for describing the mounting position of a transparent guard.

In the Figures, a head-mounted video display 10 is shown, which is worn by the viewer while in use. The display 10 comprises a display body 11, opposite side support frames 15 constituting a support for mounting the display body 11 on the viewer's head, and opposite side tightening bands 16. The display 10 further comprises a transparent guard 20 which extends into a space between the display body 11 and the face of the viewer wearing the display 10.

In use, the display body 11 is before the eyes of the viewer, as shown in FIG. 14, and it accommodates an electronic subject video display unit for projecting an electronic image as a virtual image on the viewer's pupils. The electronic subject video display unit may have resort to an LCD, an enlarging optical system, etc. for displaying video signal. In this embodiment of the head-mounted video display system, the display body 11 is connected in use via a cable to a video source (not shown), and an image from such a video source is displayed on the LCD or the like. For example, the video source may be an endoscope for taking images as the source of electronic subject video displayed on the display 10.

The display body 11 constitutes a member which functions to prevent the electronic subject video from being disturbed directly by external light. For example, the outer fitting of the display body 11 is made from a member which does not transmit external light. Thus, while the user wearing the display 10 can see the neighborhood field in the range shown by dashed lines in FIG. 14 irrespective of the position of the transparent guard 20, external light led in the direction, in which the virtual image is led from the electronic subject video display unit (i.e., the direction of the axis of observation of the electronic subject video in FIG. 14), is blocked.

The above optical content of description applies to the embodiments described hereinunder as well.

In FIG. 13 showing the head-mounted video display 10 with the transparent guard 20 mounted thereon, the transparent guard 20 is screwed by screws 31 on the front of the display body 11. However, it is also possible to mount the transparent guard removably. A suitable example of the removable transparent guard type will be described hereinunder.

The transparent guard 20 is made of a transparent material, through which external light from below the virtual light image led from the electronic subject video display unit can be transmitted to be led to the eyes of the viewer. Thus, the member 20 may be any member so long as it can be screwed to the display body 11 to prevent external foreign matter from coming through the clearance between the display body 11 and the viewer's face. Suitably, it is made from a plastic sheet, for instance of acrylic acid, vinyl chloride, polyethylene, polypropyrene, etc.

Preferably, the transparent guard 20 is provided with means for preventing reflection of light and also means for preventing charging. In the instant case, the transparent guard 20 is provided with charging prevention means, and its surface 20a on the viewer's side (i.e., the surface facing the viewer's face when the display 10 is worn as shown in FIG. 14) is provided with light reflection prevention means, that is, the surface 20a is an anti-reflection surface. These apply to the transparent guard in the embodiments described hereinunder as well.

This embodiment of the head-mounted display 10 with the transparent guard 20 can be used as follows.

In the case of use of the head-mounted video display by the doctor as an electronic subject video monitor for surgery using an endoscope having a television camera, the display is mounted on the head with the endoscope connected to it as shown in FIG. 14.

A doctor who uses a head-mounted video display for a surgical procedure, conceals part of the face with a mask or a cap. However, the mask or cap conceals only the corresponding part and does not conceal the eyes and the neighborhood thereof. Therefore, without the transparent guard 20 it is possible for blood or the like to splatter from the neighborhood field part despite that the head-mounted video display is worn (see FIG. 14).

With the transparent guard 20 in this embodiment, which is mounted on the front surface of the display 10 as a member for guarding the face against splattered blood or the like, it is possible to prevent infection of the doctor from contact with of the patient's blood. In addition, the doctor considers the neighborhood field seriously as well as the display video, and the transparent guard 20 which guards the face against splattered blood does not constitute an obstacle of viewing of the neighborhood field irrespective of its position.

The transparent guard 20 has a further function of protecting the display body itself 11 against splattered blood. This is effective for the purpose of sterilization of the head-mounted video display.

While the transparent guard 20 shown in FIG. 13 is in the form of a flat plate lying in a plane, this is not limitative; its different examples are as shown in FIG. 14.

In the illustration of FIG. 14, the transparent guard suitably extends at an angle within 90 degrees toward the viewer (i.e., counterclockwise in the Figure) from the direction at right angles to the axis of observation of electronic subject video (i.e., from the downward direction). In the specific examples illustrated, transparent guard 20 extends straight in the downward direction (i.e., at an angle of 0 degree), transparent guard 20' has a slightly bent lower portion, and transparent guard 20" has a lower portion bent at right angles (i.e., at an angle of 90 degrees). This applies to the embodiments described hereinunder.

With the transparent guard mounted in the above range on the head-mounted video display 10, it is possible to prevent adverse effects of splattered blood during the surgical procedure, that is, it is possible to prevent attachment of splattered blood to the doctor's face or to the display body 11. Nevertheless, the neighborhood field can be viewed through the clearance between the display body 11 and the face. The manner of mounting the transparent guard 20" is not obstructive to viewing the neighborhood field: the neighborhood field can be viewed through the transparent guard 20".

It is possible to make the angle of the transparent guard variable in the illustrated range. In this case, the user who wears the display can select a desired angle of the transparent guard.

The head-mounted display 10 with the transparent guard as shown above, permits the doctor wearing it for a surgical procedure to view the display video and the neighborhood field without overlap of the latter over the former. Specifically, the display 10, when used as a monitor of an endoscope, permits the endoscope video and the neighborhood field (of the patient or other data video) without overlap. The display 10 can further adequately prevent foreign matter from the neighborhood from coming through the clearance between the display body 11 and the user's face, that is, a guarding function is provided. A further effect that is obtainable is that without any goggles worn, it is possible to prevent blood or the like splattered from the surgical site from coming into contact with the surgeon.

In the case shown in FIGS. 13 and 14, the surface 20a of the transparent guard 20 (or 20' or 20") on the side of the viewer is provided with anti-reflection means. With the anti-reflection means provided on the transparent guard 20, the neighborhood of the viewer can be viewed through the clearance between the display body 11 and the viewer's face and through the transparent guard 20 without undesired reflection by the surface 20a of the transparent guard 20. Thus, the viewing of the neighborhood can be facilitated.

The transparent guard 20 (or 20' or 20") is further provided with an anti-charging means. The anti-charging means provided on the transparent guard 20 has an effect of preventing the attachment of fine dust particles to the transparent guard 20.

The anti-charging means is particularly desired in the case when the doctor attaches the transparent guard 20 to the display 10 before entering the surgery room for a surgical procedure. If the transparent guard has been charged in such case, fine dust particles may be attached to the member and may fall onto the surgical site of the patient during the surgical procedure in the surgery room. In addition, dust particles or the like that are attached may impede accurate viewing of the neighborhood of the viewer through the clearance between the display body 11 and the viewer's face and through the transparent guard. The anti-charging means eliminates the above drawbacks.

In the above example, the transparent guards 20, 20' and 20" were in the form of a flat or bent sheet. However, it is possible to use a transparent guard having a shape such that it covers the display body 11.

Figure 15:
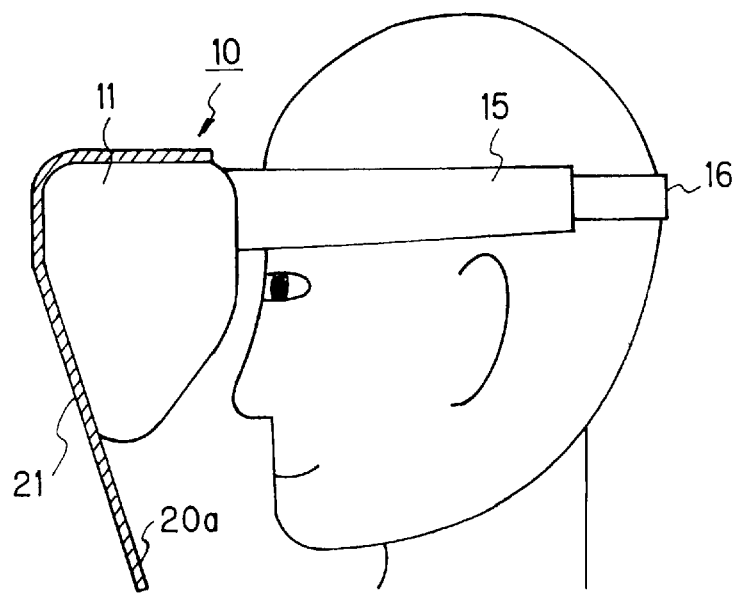
FIGS. 15 and 16 show an example of such transparent guard.
Figure 16:
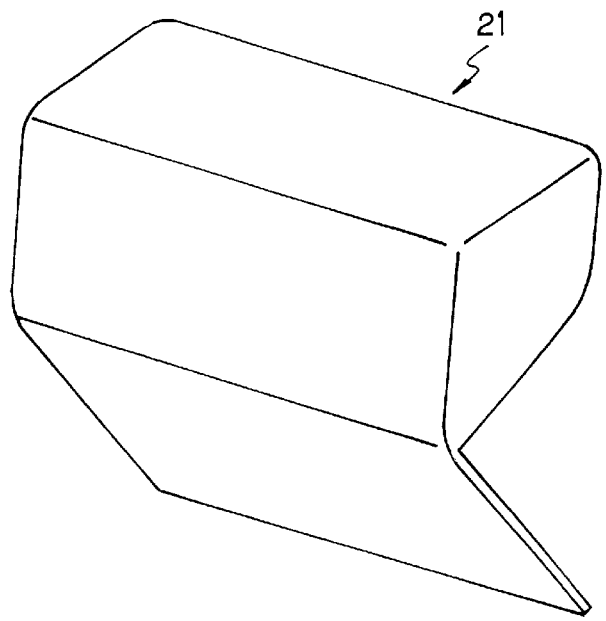

FIGS. 15 and 16 show an example of such a transparent guard. Specifically, in FIG. 15 a transparent guard 21 of the type covering the display body 11 is shown mounted on the head-mounted video display 10 which is shown mounted. Again, the transparent guard 21 may be removable. FIG. 16 shows, in perspective, the sole transparent guard 21 which covers the display body 11.

The illustrated transparent guard 21 has substantially a rectangular shape such that it covers the top, front and opposite sides of the display body 11 and has a lower portion extending into the clearance between the display body 11 and the face of the wearer. This transparent guard 21 is mounted on the head-mounted video display 10. The remainder of the structure may be the same as described before in connection with FIGS. 13 and 14.

In this embodiment, in addition to obtaining effects like those described above, the transparent guard shown in FIGS. 13 and 14 permits more accurate and reliable protection of the display body 11 against splattered blood or the like to be realized when the surgeon using the head-mounted video display 10 does a surgical procedure. Thus, the display 10 need not be sterilized, and also it need not be provided with water-proof means or chemical-proof means.

A further embodiment (i.e., eighth embodiment) of the present invention will now be described.

Again this embodiment, like the preceding embodiment (i.e., seventh embodiment) described in connection with FIGS. 13 to 16, is based on a head-mounted video display which comprises an electronic subject video display unit for projecting an electronic subject video image as a virtual image onto the viewer's pupils, neighborhood light guarding means for guarding neighborhood light led in the direction in which the virtual image is led from the electronic subject video display unit, and a transparent guard, through which neighborhood light from beneath the virtual image led from the electronic subject video display unit is transmitted to be led to the viewer's pupils. Several examples described hereinunder with reference to FIGS. 17 to 24 are improvements one step ahead of the above basic head-mounted video display such that the transparent guard is removable.

The improvements are as follows.

Splattered blood or like matter splattered from the surgical site during surgery, may be attached to the transparent guard as described above and, depending on the extent of attachment, makes it less easy to view the neighborhood. In such a case, it may be necessary to replace the transparent guard.

This embodiment seeks to add a measure for realizing this. Again this embodiment has basically the same structure as the seventh embodiment, and its essential part will now be described.

Figure 17:
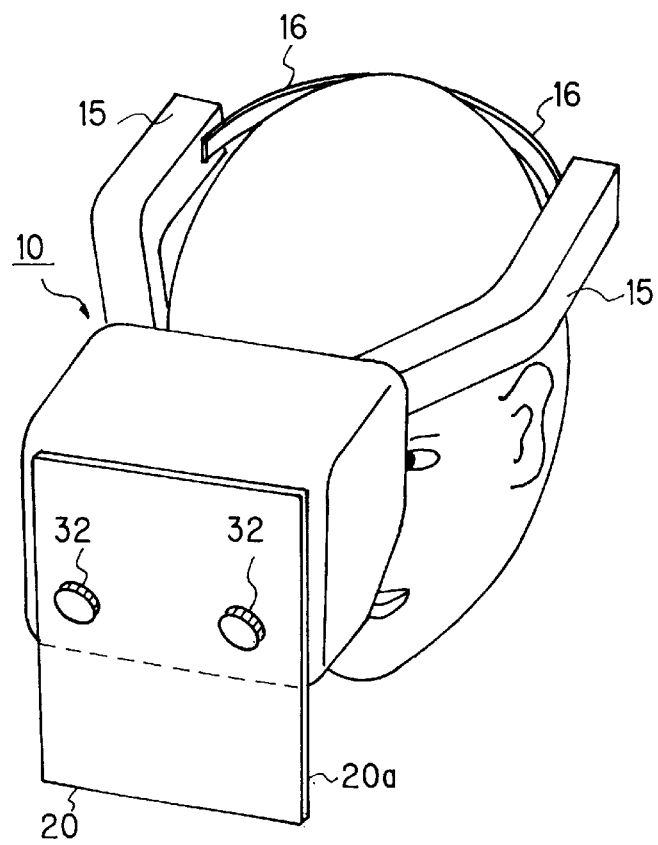
FIGS. 17 and 18 show an example of head-mounted video display 10 with a detachable transparent guard 20 mounted thereon, the display 10 being shown mounted on the viewer.
Figure 18:
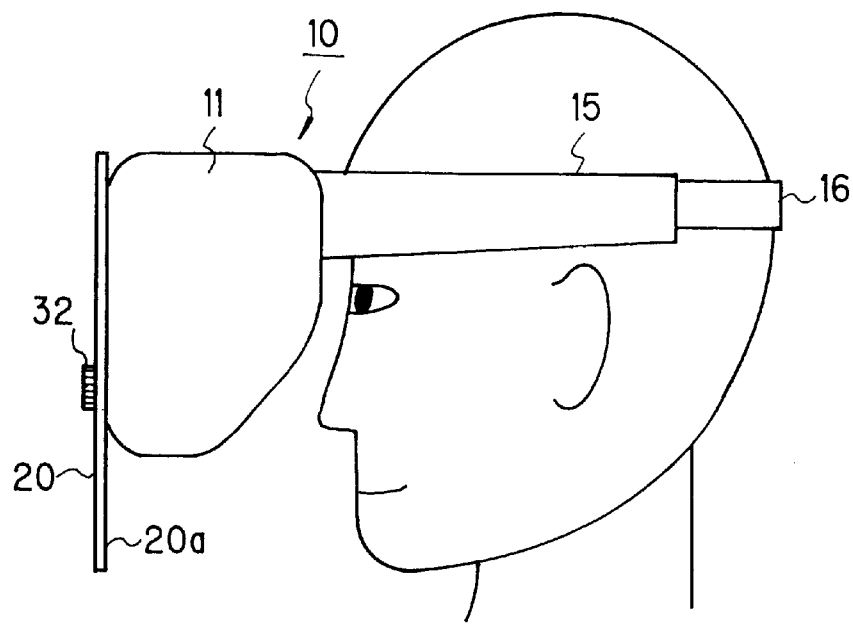

FIGS. 17 and 18 show an example of head-mounted video display 10 with a detachable transparent guard 20 mounted thereon, the display 10 being shown mounted on the viewer.

Figure 19:
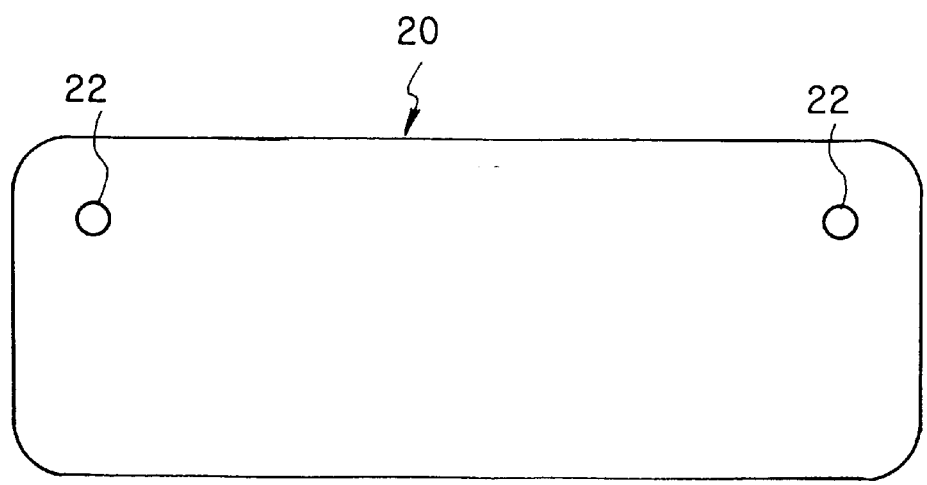
FIGS. 19 and 20 show examples of detachable transparent guard 20.
Figure 20:
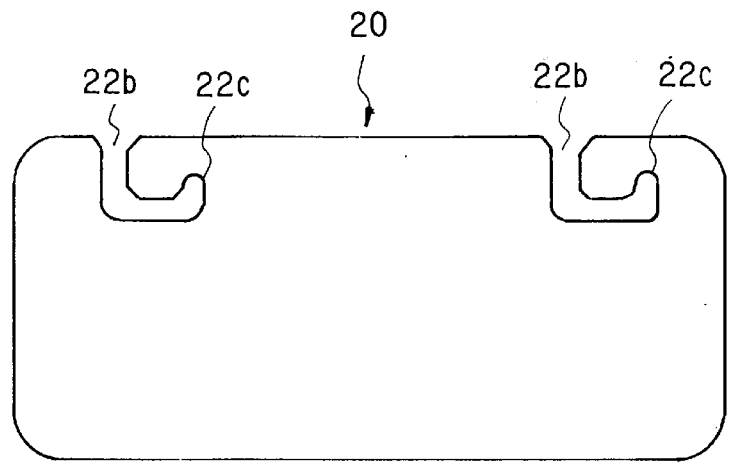

FIGS. 19 and 20 show examples the detachable transparent guard 20 that may be used.

In the example shown in FIGS. 17 and 18, the detachable transparent guard 20 is mounted by knobs 32 on the head-mounted video display 10. The knobs 32 are shown provided at two, i.e., lower left and right, positions of the flat front surface of the display body 11.

The detachable transparent guard 20 which is assembled to such display body 11, is a single transparent sheet or plate as shown in FIG. 19, and has mounting holes 22 formed at two, i.e., upper left and right, positions which are in register with the mounting positions of the left and right knobs 32 of the display body 11 for its mounting thereon.

With this structure of the embodiment, the transparent guard 20 can be detachably mounted by passing threaded shaft portions of the knobs 32 through its mounting holes 22 and then screwing the knobs 32 in the display body 11.

The remainder of the structure is the same as the structure described before in connection with FIGS. 13 and 14. This is applied to the following embodiments as well.

In this embodiment of the head-mounted video display 10, in addition to the effects obtainable with the seventh embodiment, owing to the detachable transparent guard 20 it is also possible to obtain an effect that when the guard (i.e., transparent guard) is contaminated, it can be readily replaced during or after the surgical procedure. The transparent guard 20 thus can be clean at all times when the display 10 is used continuously. As a further effect, the transparent guard 20 may be made consumable, or at least it may be adapted to be washed and sterilized.

The transparent guard 20 may be replaced by removing the knobs 32 when splattered blood from the surgical site is attached to it during the surgical procedure of the doctor with the head-mounted video display 10 thereon or when blood attached to it is found after the surgical procedure.

FIG. 20 shows a different transparent guard 20, which has mounting notches and fall-off prevention grooves in lieu of the mounting holes 22 in the transparent guard shown in FIG. 19.

Specifically, the transparent guard 20 shown in FIG. 20 has mounting notches 22b formed in its two, i.e., upper left and right, positions and fall-off prevention grooves 22c extending from the respective mounting notches 22b. This transparent guard 20 can be removed by using the fall-off prevention grooves 22c and the mounting notches 22b continuous therefrom and without removing the knobs 32 but by merely loosening the knobs 32. The transparent guard 20 thus can be more readily replaced.

Since the transparent guard 20 is replaceable, it is again possible to have the transparent guard 20 clean at all times when the head-mounted video display 10 is used continuously. The transparent guard 20 may also be discarded after use or may be adapted to be washed and sterilized for re-use.

When the transparent guard is produced by using a thin material for reducing its weight, it is comparatively weak in mechanical strength, and its breakage is liable. Such breakage is coped with since the transparent guard is replaceable.

The FIG. 19 transparent guard 20 with the mounting holes 22 can be prevented from falling off by screws or the like inserted in the holes 22. The FIG. 20 transparent guard 20 also can be prevented from falling off by screws or the like hooked in the fall-off prevention grooves 22c, while it can be readily removed owing to the presence of the mounting notches 22b.

Figure 21:
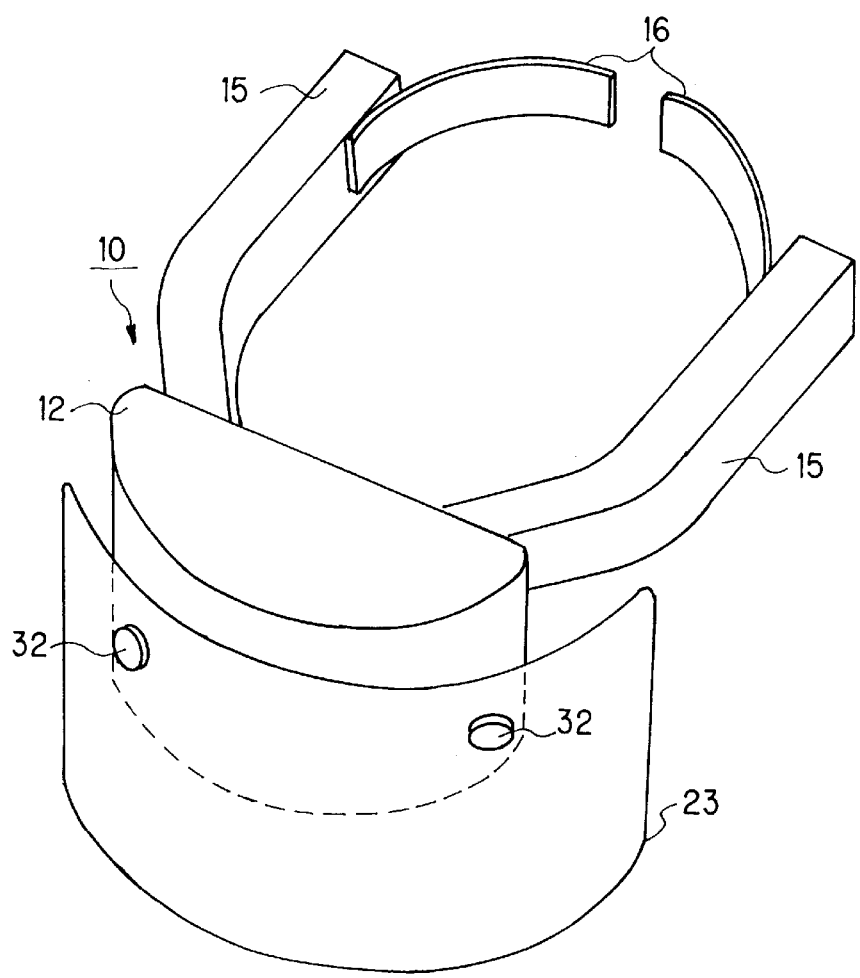
FIG. 21 shows the head-mounted video display 10 including semi-cylindrical transparent guard 23.
Figure 22:
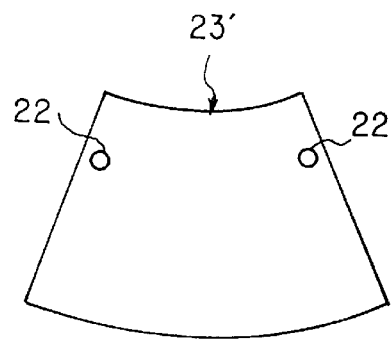
FIGS. 22 and 23 show the conical transparent guards 23' and 23"
Figure 23:
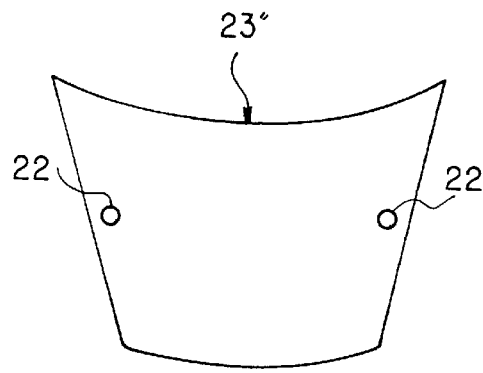

The example described before in connection with FIGS. 17 to 20 used a flat, plate-like detachable transparent guard 20, which was disposed before the front surface of the head-mounted video display. FIGS. 21 to 23 show examples of transparent guards which cover the sides of the display body as well. The example shown in FIG. 21 is a semi-cylindrical transparent guard which covers the sides of the display body as well. The examples shown in FIGS. 22 and 23 are conical transparent guards 23' and 23" having the same effect.

More specifically, in the head-mounted video display 10 shown in FIG. 21, the semi-cylindrical transparent guard 23 covers the display up to the sides thereof. In this display 10, the display body 12 has a semi-cylindrical front. The semi-cylindrical transparent guard 23 is matched to this semi-cylindrical shape of the display body 12, and it can be mounted detachably thereon by knobs 32. When mounted, the transparent guard 23 covers the display body 12 up to the sides thereof.

The conical transparent guards 23' and 23" shown in FIGS. 22 and 23, cover certain parts of the cover range of the transparent guard 23 shown in FIG. 21, which covers the front and opposite sides of the display body 12. Again these conical transparent guards 23' and 23" can be detachably mounted on the head-mounted video display 10.

Since these transparent guards 23, 23' and 23" which cover at least part of the cover range before the front and opposite sides of the head-mounted video display 10 are semi-cylindrical or conical in shape, the viewer wearing the display 10 can view the neighborhood through the clearance between the display body 12 and the face and also through any of these transparent guards without being interfered with by any border line that might otherwise be produced between the front and each side of, for instance, a channel-like transparent guard. Besides, these transparent members are simple in shape and can be readily machined, and also they are less easily bent. These effects are obtainable in addition to the effects as described above. The transparent guards 23, 23' and 23", like the examples described above in connection with FIGS. 18 to 21, may of course be provided with anti-reflection means and/or charging prevention means.

Figure 24:
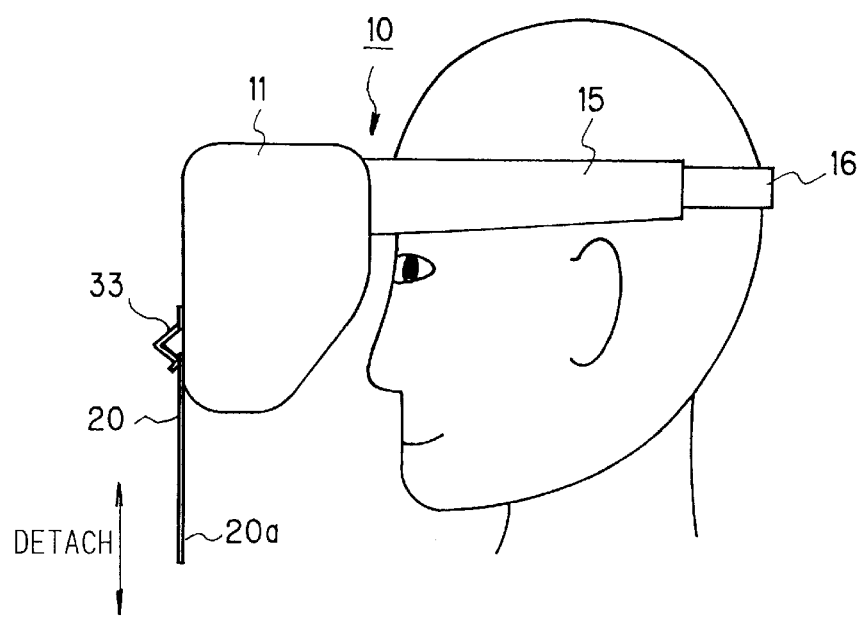
FIG. 24 shows a further example of head-mounted video display 10, which has a clip section for detachably attaching a transparent guard 20.

FIG. 24 shows a further example of head-mounted video display 10, which has a clip section for detachably attaching a transparent guard 20. Like FIG. 18 noted before, in the Figure the head-mounted video display 10 is shown mounted with the transparent guard 20 attached to it on the head of the user. The clip section for detachably attaching the transparent guard 20 to the display 10 comprises springs (or clips) 33.

As an example, two leaf springs 33 may be provided on left and right portions of the front surface of the display body 11. The lead springs 33 are secured at one end (i.e., upper end), and the transparent guard 20 is attached as shown by inserting its upper portion between the other end of (i.e., lower end) of the springs and the front surface of the display body 11. From this state, the transparent guard 20 can be detached by pulling it down.

With this head-mounted video display 10, when blood scattered from the surgical site is attached to the transparent guard 20, the transparent guard 20 can be detached and attached again by one touch operation utilizing the springs 33. During surgery, blood splattered and attached to the transparent guard 20 may make it difficult to view the neighborhood, and in such a case it may be necessary to replace the transparent guard 20 at that time. With the structure shown in FIG. 24, the replacement may be made more easily and quickly by one touch operation of detachment of the contaminated transparent guard and one touch operation of attachment of the new transparent guard. This facilitates smooth surgical procedure.

A further embodiment (i.e., ninth embodiment) of the present invention will now be described with reference to FIG. 25 and following Figures. This embodiment is an improvement in the head-mounted video display 10 with a transparent guard such that the display body can be kicked up when desired.

This embodiment is the same as the previous seventh embodiment in the basic structure, and only the improvement will be described.

Figure 25:
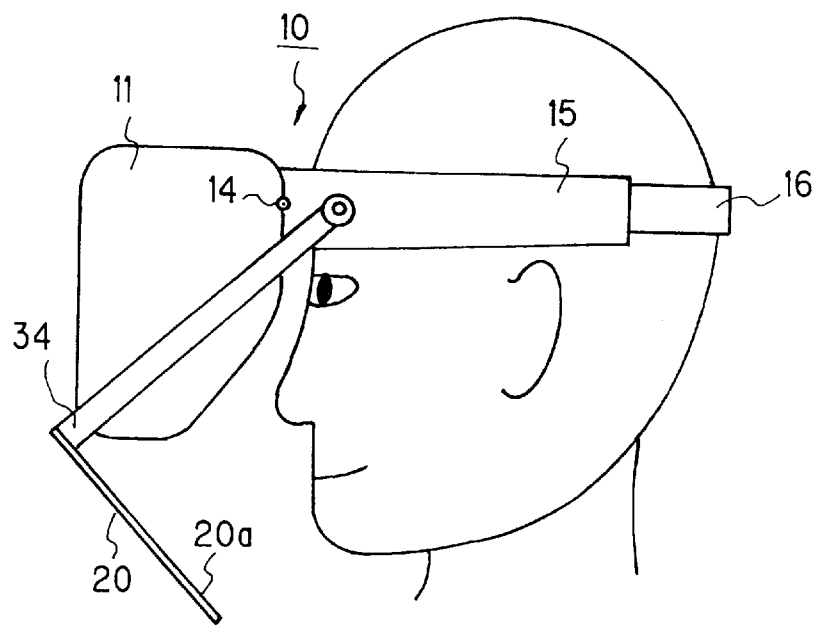
FIGS. 25 and 26 show an example of head-mounted video display, in which the display body 1 can be kicked up without change in the position of the transparent member used.
Figure 26:
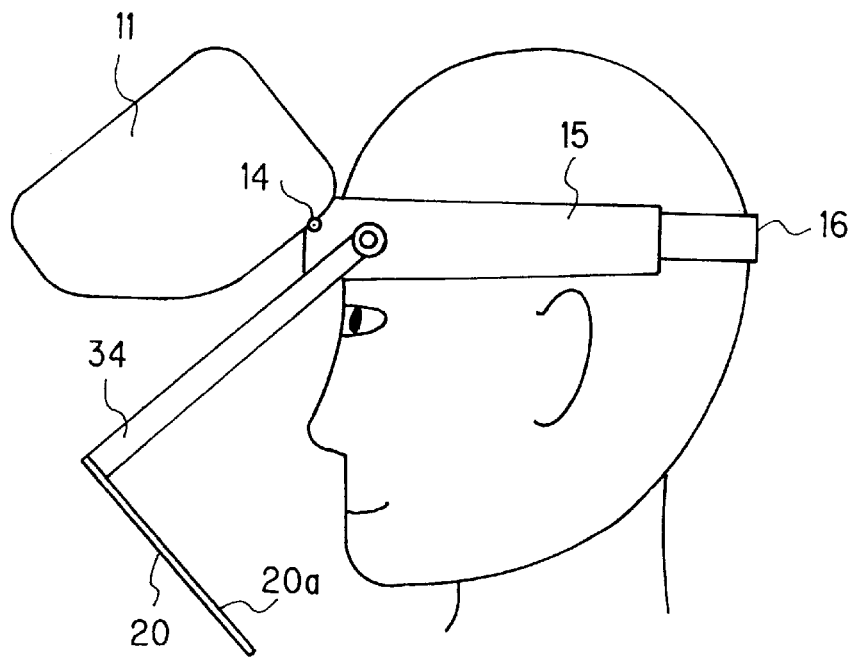

FIGS. 25 and 26 show an example of head-mounted video display, in which the display body 1 can be kicked up without change in the position of the transparent member used. FIG. 25 shows the head-mounted video display in the normal position (for viewing the electronic subject video), and FIG. 26 shows the display with the display body kicked up. In this example, the transparent guard 20 is secured to a support for mounting the display body 11 on the head. The display body 11 can be kicked up relative to the support.

The transparent guard 20 is secured at the illustrated angle and position to free ends of mounting arms 34 which extend forwardly downward from a support frame 15. The display body 11 is hinged by a hinge 14 to the support frame 15. The display body 11 thus can be kicked from the position shown in FIG. 25 to the position shown in FIG. 26 (or vice versa) without change in the angle and position of the transparent member 20 at the free ends of the arms 34. For the remainder of the structure, the example is the same as the first embodiment. This also applies to the following examples.

The head-mounted display 10, in addition to providing the effects obtainable with the previous seventh embodiment, can be switched in use between the positions shown in FIGS. 25 and 26, so that it is more convenient. For example, when the doctor thinks to set the electronic subject video aside from the field of the sight during the surgical procedure without dismounting the head-mounted video display 10, he or she may only kick up the display 10 from the video observation state thereof shown in FIG. 25. By so doing, the display body 11 can be easily set aside from the video observation position (as shown in FIG. 26). Besides, since the head-mounted video display 11 with the transparent guard 20 thereon is not dismounted from the head of the user (i.e., doctor), the angle and position of the transparent guard 20 shown in FIG. 25 is not changed to those shown in FIG. 26 by setting the display body 11 aside from the video observation position as shown in FIG. 26. It is thus possible to prevent contact of patient's blood or the like with the doctor's face without wearing any goggles or glasses for the purpose of protection against splattering of blood or the like. In addition, the shift of the display body 11 can be done readily and easily even during the surgical procedure.

Figure 27:
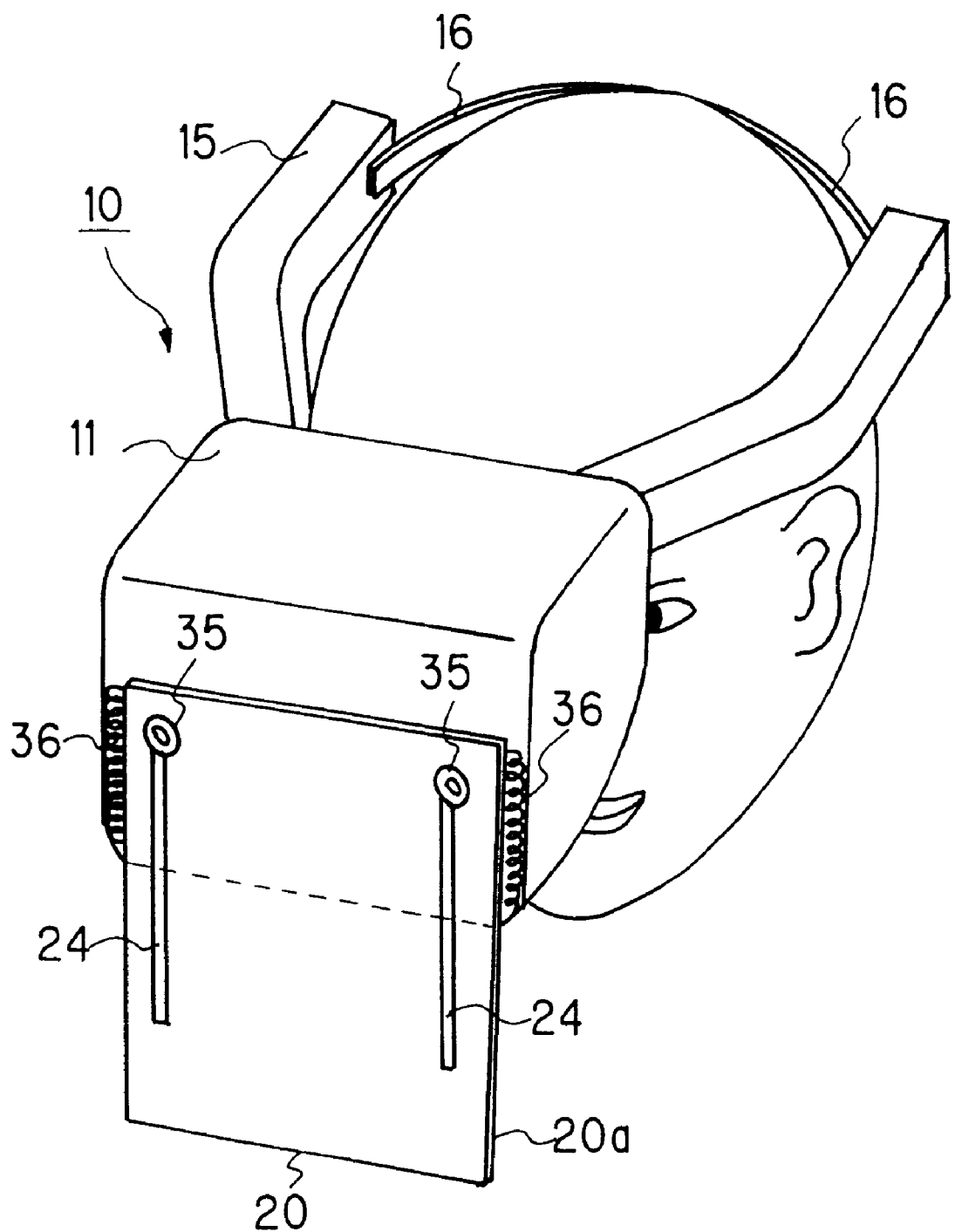
Figure 28:
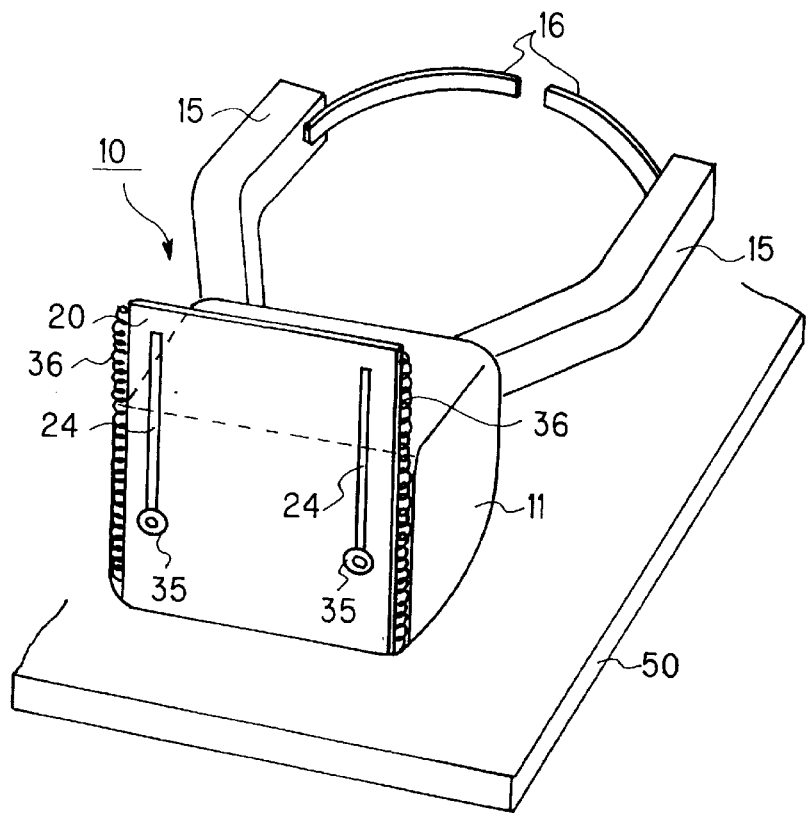

FIGS. 27 and 28 show a different example of a head-mounted video display 10, in which the transparent member 20 is slidable vertically relative to the display body 11. FIG. 27 shows the display 10 worn by the user, and FIG. 28 shows the display 10 put on a table or the like.

In this example, the display body 11 has two guide pieces 35 provided on the front surface at left and right positions thereof, and the transparent guard 20 which is in the form of a single flat sheet or plate has two, i.e., left and right, vertical guide grooves 24, in which the guide pieces 35 are loosely received. The engagement between the guide pieces 35 and guide grooves 24, supports the transparent guard 20 such that the guard 20 is vertically slidable relative to the display body 11. Biasing springs 36 are provided between the top of the opposite side edges of the transparent guard 20 and a lower portion of the front surface of the display body 11. In the normal state of the display 10 as shown in FIG. 27, the transparent guard 20 is thus held biased to be at its lower set position as shown.

This example, in addition to the effects as described, is effective for the prevention of breakage of the transparent guard and convenience of the head-mounted video display as follows.

In the normal state of the head-mounted video display, the transparent guard projects downward from the display body, and its bending is liable by putting the head-mounted video display on a plane. In this example, this can be prevented owing to the fact that the transparent guard 20 is vertically slidable relative to the display body 11.

More specifically, when the viewer removes the head-mounted video display in the state shown in FIG. 27 from his or her head and puts it on a table 50, for instance, the transparent guard 20 can be brought to the position shown in FIG. 28 by applying a force to push it up against the biasing forces of the springs 36. Conversely, the transparent guard can be restored from the position shown in FIG. 28 to the position shown in FIG. 27 by taking the head-mounted video display 10 from the table 50.

As shown, with this example it is possible to cause upward sliding of the transparent guard 20 when putting the head-mounted video display 10 on a table or the like, thus preventing the bending or breakage of the guard 20. Besides, the user can conveniently put the display 10 on a place together with the transparent guard 20 attached to the display 10.

Figure 29:
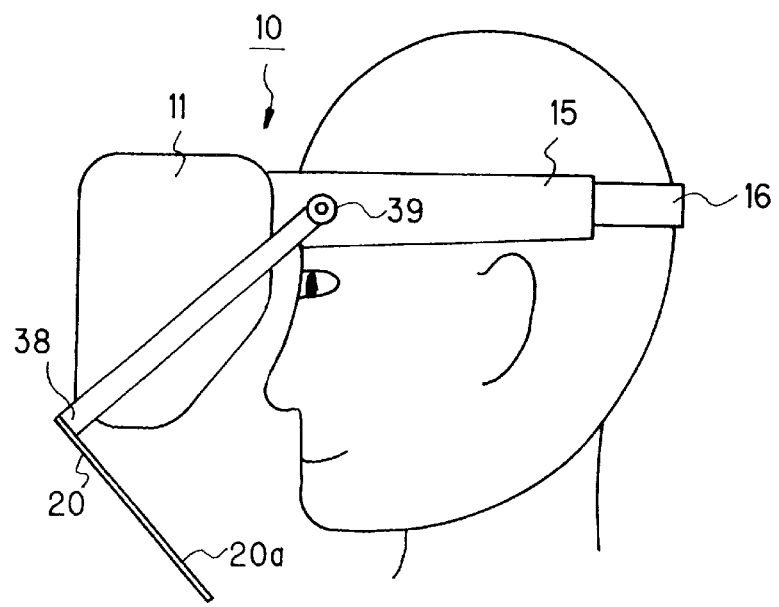
FIGS. 29 and 30 show a further example of head-mounted video display 10, in which the transparent guard 20 can be kicked up relative to the display body 11, FIG. 29 representing the viewer wearing the display 10 with the transparent guard 20 of the kick-up type, and FIG. 30 representing the same but with the transparent guard 20 in the kicked-up position.
Figure 30:
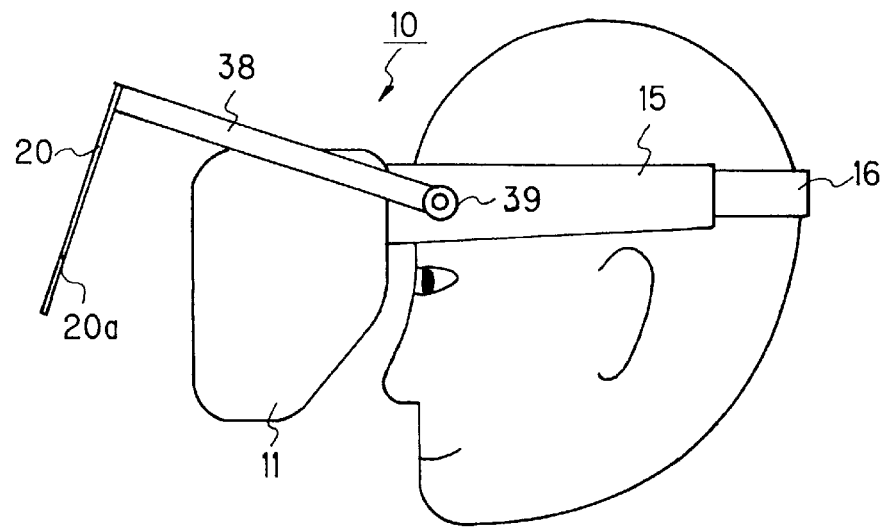

FIGS. 29 and 30 show a further example of head-mounted video display 10, in which the transparent guard 20 can be kicked up relative to the display body 11. FIG. 29 shows the viewer wearing the display 10 with the transparent guard 20 of the kick-up type, and FIG. 30 shows the same but with the transparent guard 20 in the kicked-up position. Again with this example, the same effects as those in the example shown in FIGS. 27 and 28 are obtainable. In this example, the transparent guard 20 is kicked up instead of vertical sliding.

As shown in the Figures, the transparent guard is provided on the free ends of arm 38 hinged by hinges 39 to a support frame 15. The transparent guard 20 thus can be switched in position via the arm 38 from the normal position (i.e., working position) as shown in FIG. 29 to the kicked-up position as shown in FIG. 30.

With this example, the head-mounted display 10 may be put on a table 50 or like flat plane with the transparent guard 20 held in the kicked-up position as shown in FIG. 30. That is, the head-mounted video display 10 can be placed down together with the transparent guard 20 attached to it while preventing bending of the transparent guard 20, or like undesired result. The same effects as those of the above example are thus obtainable.

Figure 31:
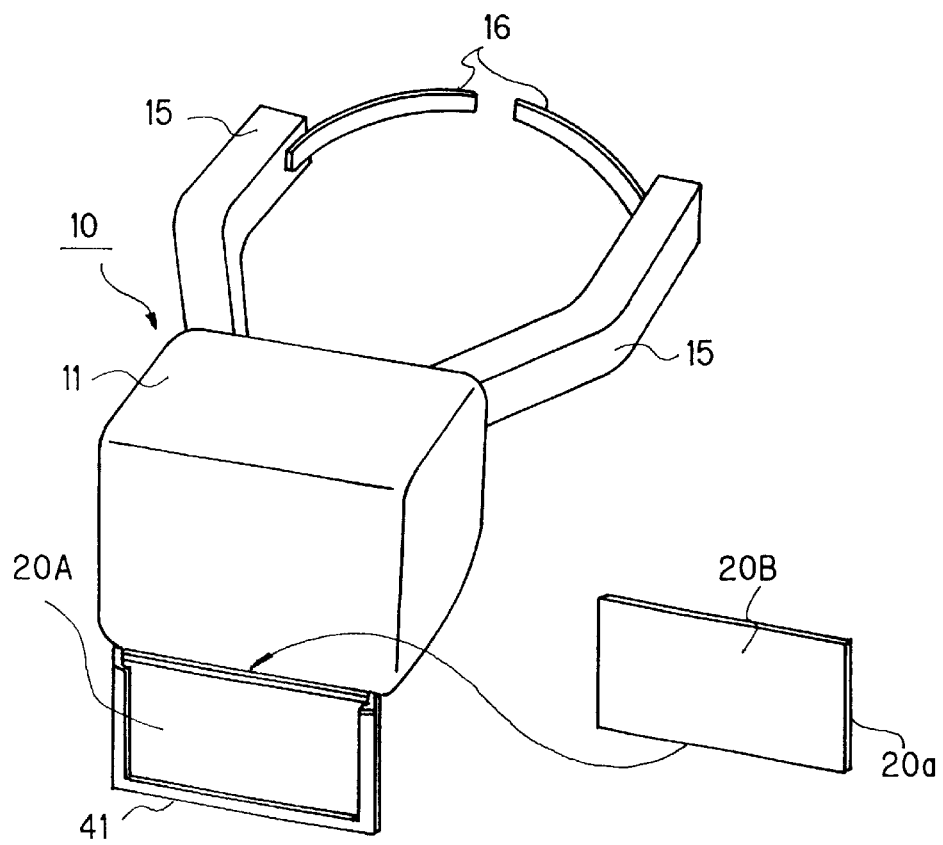
FIGS. 31 and 32 show examples of the head-mounted video display, in which the transparent guard can be detachably attached to a guard frame.
Figure 32:
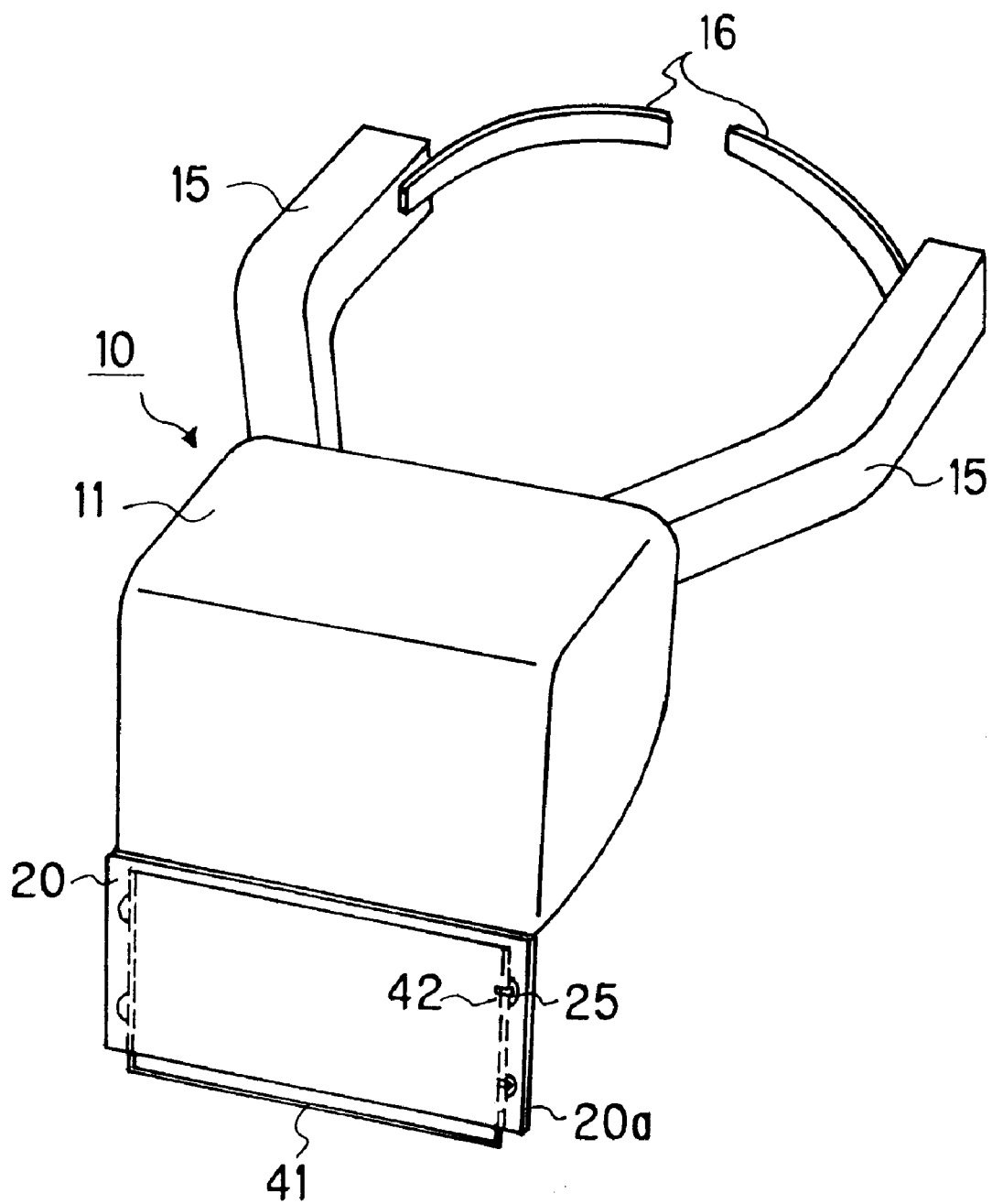
Figure 33:
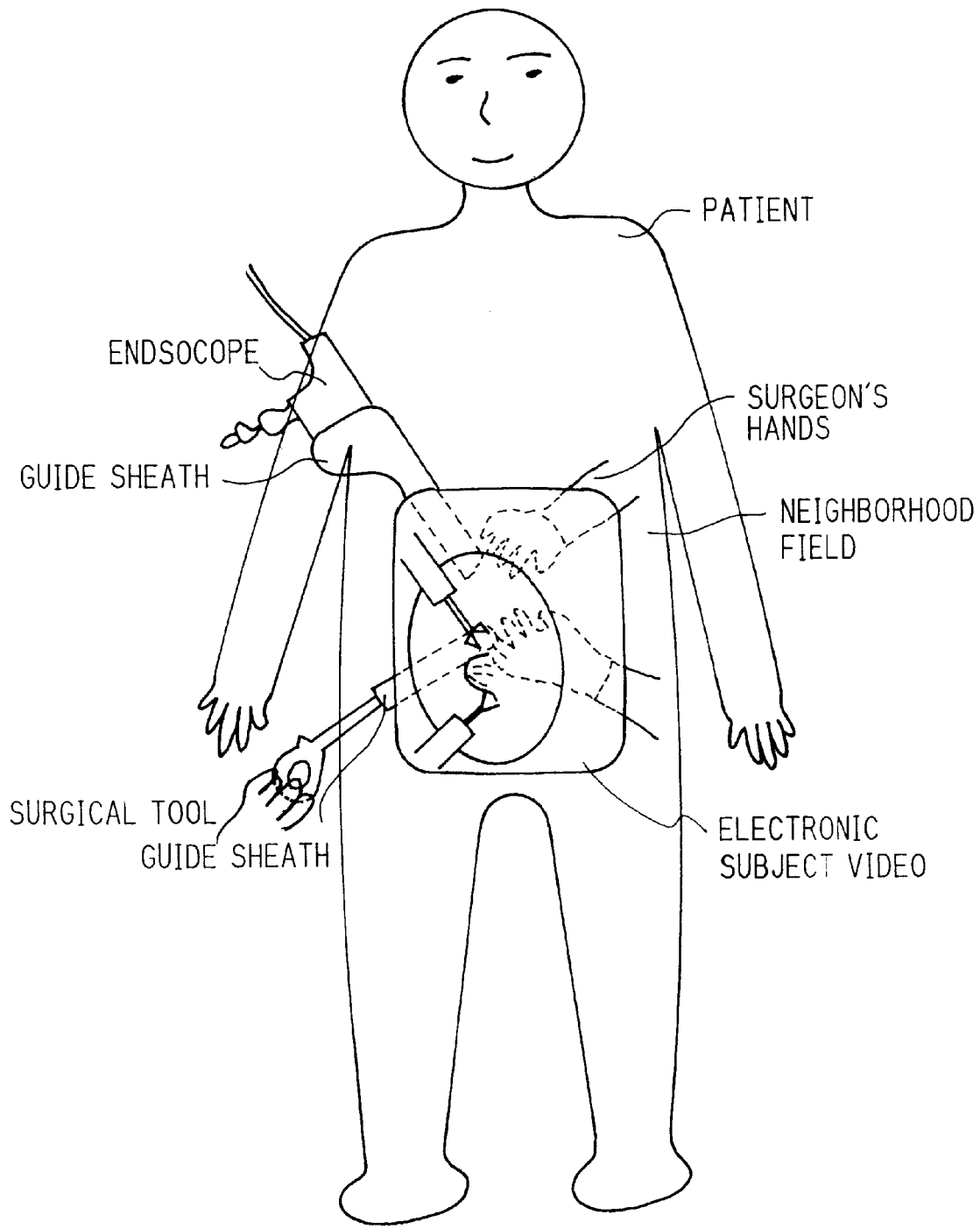
FIG. 33 is a view illustrating this viewpoint, specifically a view showing a case in which the electronic subject video and neighborhood field are superimposed on each other on the head-mounted video display used as a surgical monitor for the purpose of observation by the surgeon.

FIGS. 31 and 32 show examples of head-mounted video display, in which the transparent guard can be detachably attached to a guard frame. These examples are modifications of the previous eighth embodiment. Either of them has the guard frame, to which the transparent guard 20 is detachably attached.

In the example shown in FIG. 31, the display body 11 has the guard frame 41 projecting downward from the lower edge of its front surface. The guard frame 41 permits insertion of the transparent guard 20 into it and removal of the guard 20 from it. The transparent guard 20A which is in use thus can be replaced by removing it from the guard frame 41 and inserting a new transparent guard 20b into the guard frame 41.

In the example shown in FIG. 32, the display body 11 likewise has the guard frame 41 projecting downward from the lower edge of its front surface. The guard frame 41 of this example, however, has four guard attachment pawls (or hooks) 42 provided at upper and lower, left and right positions adjacent its opposite side edges. The transparent guard 20 to be attached and detached, on the other hand, has four, i.e., upper and lower, left and right, hooking holes 25 corresponding in position to the positions of the pawls 42 so that the pawls 42 can be hooked in the hooking holes 25. With the pawls 42 and hooking holes 25, the transparent shield 20 can be attached by hooking its hooking holes 25 on the pawls 41 of the guard frame 41, and also it can be detached by unhooking its holes 25. In this way, it is possible to replace the transparent guard 20 as well.

With these examples, in addition to the effects described above, owing to the presence of the guard frame 41 the head-mounted video display 10 can be handily put on a flat place without the possibility of bending the transparent guard 20.

As described before, the head-mounted video display 10 with transparent guard can be suitably utilized by the doctor as an electronic subject video monitor for surgery using an endoscope. Specifically, it is possible, by connecting to each of the examples of head-mounted video display 10 described above to an endoscope for picking up an image as a source of the electronic subject video displayed in each of the above embodiments of display 10, to view the endoscope video and the neighborhood field without overlap. Particularly, the system structure as described facilitates surgical procedures using the endoscope. The endoscope used may be of either hard or soft mirror type.

As has been shown, according to the present invention the external light shielding means and the transparent guard permit the user wearing the head-mounted video display for use to view the electronic subject video and neighborhood field without overlap of the latter over the former, and can adequately prevent foreign Matter from coming through the clearance between the display body and the face. Particularly, they permit realizing a head-mounted video display, which can be suitably used by the doctor for surgical procedures or the like.

Even in such applications, owing to the transparent guard provided on the head-mounted video display according to the present invention such as to guard the face against splattered blood or the like, disease infection of the doctor, i.e., the display wearer, from the patient can be prevented without the need for the doctor to wear any goggles or the like. In addition, the doctor wearing the head-Mounted video display thinks the neighborhood field to be as important as the electronic subject video. According to the present invention, the transparent guard serving to guard the face from splattered blood or the like meets this requirement. Besides, it does not interfere with viewing the neighborhood field. The transparent guard further protects the display body against splattered blood or the like, thus making it unnecessary to sterilize the head-mounted video display or make the display water- and chemical-proof.

Furthermore, the detachable transparent guard, when contaminated, can be adequately replaced during or after the surgical procedure. The head-mounted video display further can be continuously used such that the transparent guard is always clean. The transparent guard further can be discarded after use, or can be readily re-used after washing and sterilizing.

In the case where the display body is adapted to be kicked up relative to its support for mounting the display body on one's head while the transparent guard is secured to the support, the doctor undertaking a surgical procedure may set the display body aside from the video observation position without dismounting the head-mounted video display and without change in the position of the transparent guard, so that it is possible to prevent contact of the patient's blood or the like with the doctor's face without the need for wearing any goggles or glasses for this purpose.

Figure 34:
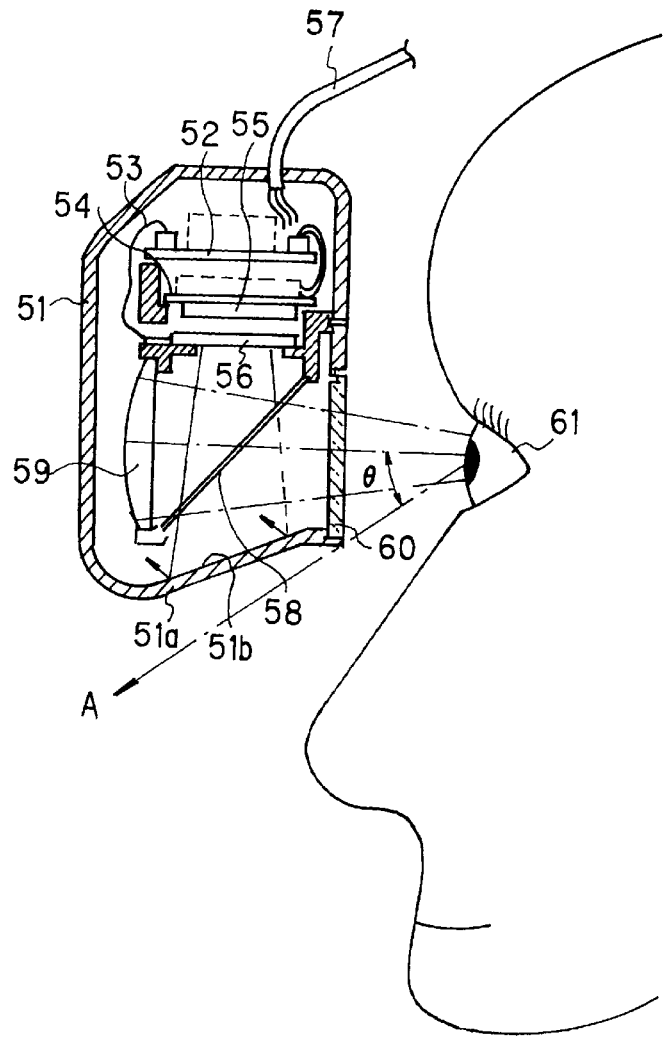
FIG. 34 shows, in section, a tenth embodiment of the head-mounted video display in the mounted state.

FIG. 34 shows, in section, a tenth embodiment of the head-mounted video display in the mounted state. The display has a housing 51 accommodating video display means, from which electronic subject video is to be observed. The video display means has an upper board 52 and a flexible board 53. Disposed underneath these boards 52 and 53 is a back-light holder 54 holding a back-light 55 for illuminating an LCD (i.e., electronic subject video display element) 56. An image from the illuminated LCD 56 is enlarged as it is led through an optical system path to be described later before being viewed. Reference numeral 57 designates a video signal feed cable.

The video image from the LCD 56 is reflected by a half-mirror 58 disposed underneath, then reflected by a convex mirror 59 to be enlarged, and then transmitted through the half-mirror 58 and an eyepiece window 60 to be incident on the pupils 61 of the viewer. The housing 51 has a bottom 58, which is inclined forwardly downward from the side of the viewer.

With the structure as described, the viewer can view the electronic subject video and, when desired, can view the neighborhood field below the housing 51 by lowering the line of sight to be in direction A. During surgery, the doctor as the viewer thus can obtain information of the electronic subject video and, when desired, can also visually view the surgical site of the patient. Thus, the doctor can do effective surgery.

The bottom 51a of the housing 51 is of course formed such as to minimize the angle between the line of sight for viewing the electronic subject video and the line of sight in the direction A.

In the meantime, light transmitted through the LCD 56 without being reflected by the half-mirror 8, may be reflected by the inner surface of the housing bottom to enter the viewer's eyes and thus generate a ghost image. In this embodiment, the bottom 51a of the housing 51 is inclined such that it reflects light toward the front of the housing 51 as shown by the arrow, thus preventing undesired light from entering the eyes of the wearer.

Figure 35:
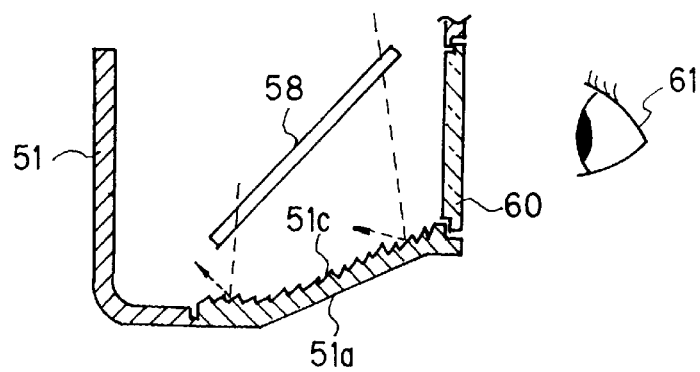
FIG. 35 shows, a fragmentary sectional view, an arrangement for more effectively preventing the undesired light.

FIG. 35 shows, a fragmentary sectional view, an arrangement for more effectively preventing the undesired light noted above. In this structure, an independently produced bottom 51a is coupled to the rest of the housing 51. The bottom 51a, while inclined to provide the same effect as described above in connection with the tenth embodiment, has its inner surface 51b formed with light-blocking grooves 51c in order to effectively reduce reflection of light transmitted through the LCD 56 without being reflected by the half-mirror 58. It is possible to provide an anti-reflection coating in lieu of the light-blocking grooves as well.

Figure 36A:
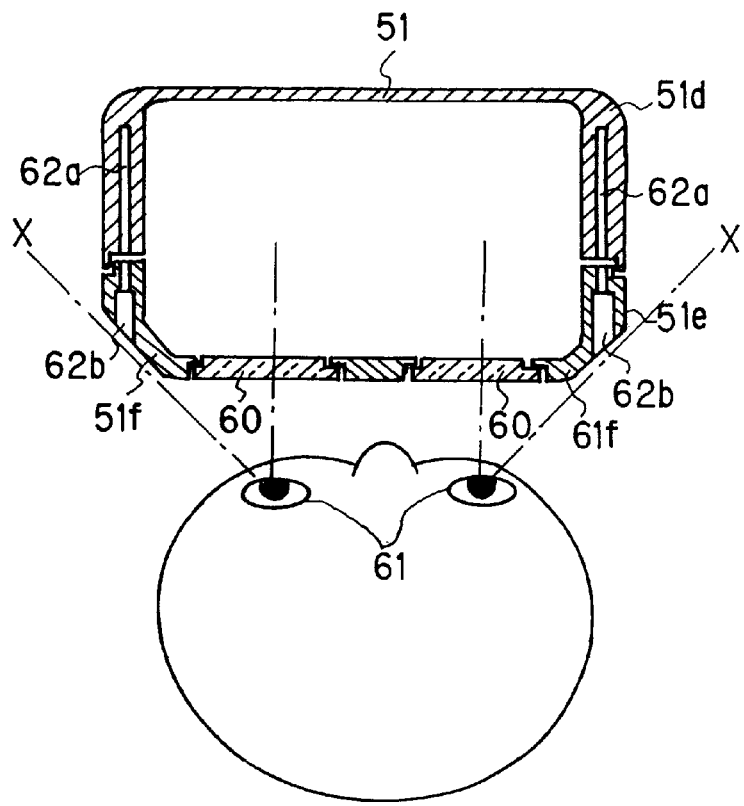
FIG. 36A and FIG. 36B are sectional views from top of housing 51, which has chamfers 51f formed at its rear left and right corners and a prior art housing without any chamfer.

FIG. 36A is a sectional view from top of housing 51, which has chamfers 51f formed at its rear left and right corners. This housing 51 comprises a front part 51d and a rear part 51e, these parts 51d and 51e being separate members and bonded together and secured to each other by inserting screws (not shown) through screw insertion bores 62b formed in the chamfers 51f into threaded bores 62b penetrating the two parts 51d and 51e.

Figure 36B:
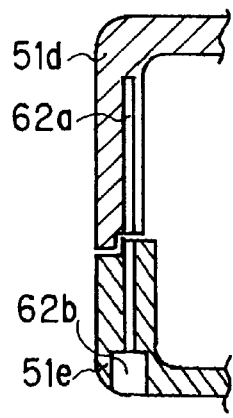

With the arrangement as described, the sight field range of the display between lines X is made closer to the line Y of sight of the viewer for viewing the electronic subject video, thus providing a corresponding increase of the left and right neighborhood fields of sight. In addition, with the provision of the chamfers 51f it is possible to reduce the housing part in the neighborhood of the screws that are inserted to secure the front and rear parts 51d and 51e of the housing 51 to each other and also reduce the length of the screws, thus permitting weight reduction of the display. With a prior art housing without any chamfer as shown in FIG. 36B, the size of the housing is correspondingly larger and requires longer screws for the securing purpose, which is undesired in view of the weight reduction.

Figure 37:
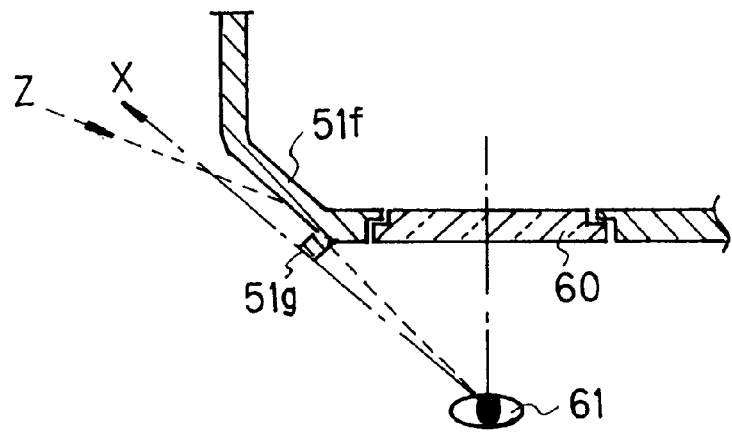
FIG. 37 shows a modification of the tenth embodiment.

FIG. 37 shows a modification of the tenth embodiment. The Figure shows a portion corresponding to the chamfer 51f shown in FIG. 36. In this modification, a protuberance 51g is formed on the chamfered portion 51f.

With this arrangement, the protuberance 51g can block external light to be otherwise incident on the viewer's pupil 61. This eliminates luster or brightness of the chamfer 51f which is otherwise caused by external light Z, thus permitting stable viewing of the neighborhood. The line X of sight defining the sight field range of the display of course passes through the free end of the protuberance 51g.

Coating the protuberance 51g in black color can further promote the anti-reflection effect.

Figure 38:
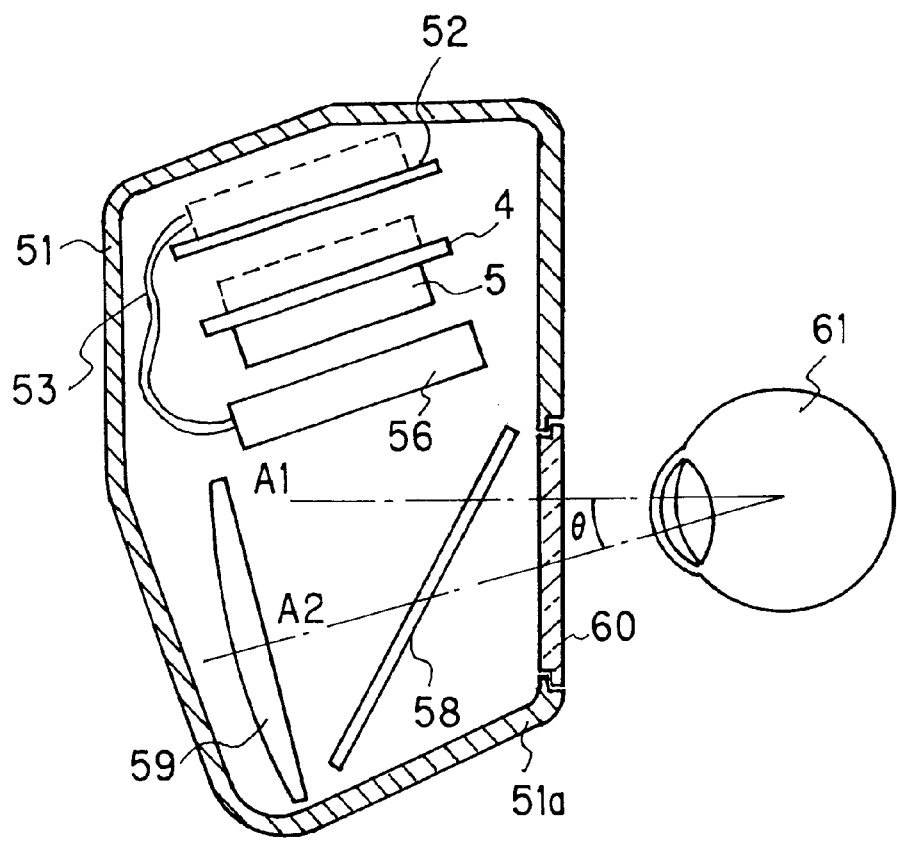
FIG. 38 shows an eleventh embodiment, in which the video display means is disposed in the housing 51 such as to be inclined forwardly downward from the side of the viewer's pupils 61.

FIG. 38 shows an eleventh embodiment, in which the video display means is disposed in the housing 51 such as to be inclined forwardly downward from the side of the viewer's pupils 61. In this structure, the concave mirror 59 for reflecting and enlarging the image from the LCD 56, the half-mirror 58 transmitting the reflected light and the eyepiece window 60 are disposed such that their centers lie in a line A2 of sight at a downward angle of 3 to 10 degrees from the horizontal line A1 of sight from the pupils 61. Like the tenth embodiment, the bottom 51a of the housing 51 is inclined forwardly downward to provide for a broader neighborhood field of sight under the housing 51.

Usually, the line of sight of a man is naturally at a slight downward angle from the horizontal direction. This permits viewing of a subject in a relaxed condition. Under this condition, long-time observation may be done with less fatigue.

Figure 39:
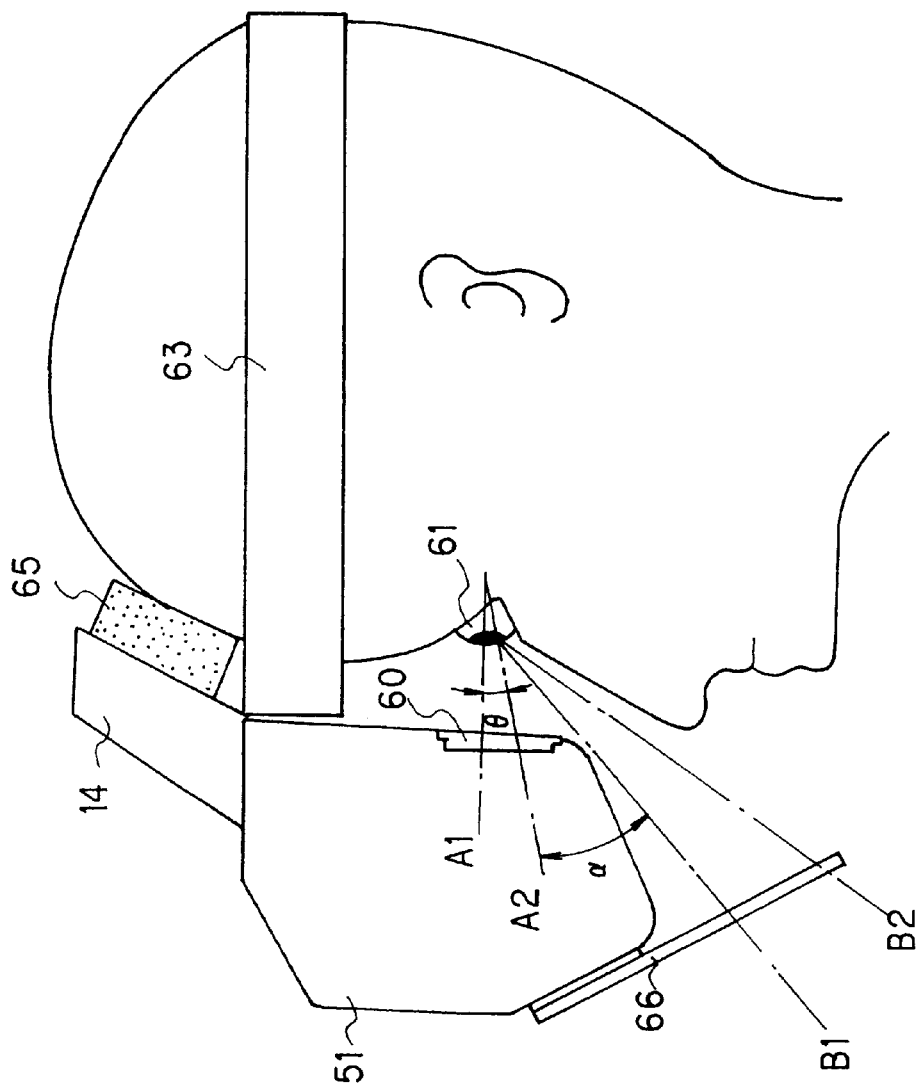
FIG. 39 shows the way of use of the eleventh embodiment.

FIG. 39 shows the manner of use of the eleventh embodiment. The housing 51 is provided with a support 63 as a display mounting means. The housing 51 is mounted via the support 63 on the viewer's head. The housing 51 is further provided at its top with an auxiliary support 64. The auxiliary support 64 supports an elastic member 65 secured to it and adapted to push the head. The support 63 is adapted to extend horizontally around the head and tightened and secured to the head at the rear thereof with a buckle or like means.

With the head-mounted video display mounted in the above way, reliable and stable state of mounting can be maintained. In addition, with the video display means disposed forwardly downward, the electronic subject video can be viewed under a relaxed condition. Moreover, like the tenth embodiment, it is possible to view the neighborhood field under the housing 51. This permits the doctor from doing a surgical procedure to visually inspect the surgical site while viewing the electronic subject video. Since the electronic subject video is seen downward in this case, the viewing of the neighborhood field underneath may be made by turning the pupils only by an angle down to the line of sight. It is thus possible to obtain observation of the neighborhood field quickly.

The visual observation range extends from the line B1 of sight to the line B2 of sight. The housing 51 is suitably provided with a guard 66 which covers this visual observation range to prevent attachment of blood or the like to the doctor's face or the like during surgery. The guard 66 should of course be transparent so that it will not interfere with the doctor's viewing of the neighborhood field.

Figure 40A:
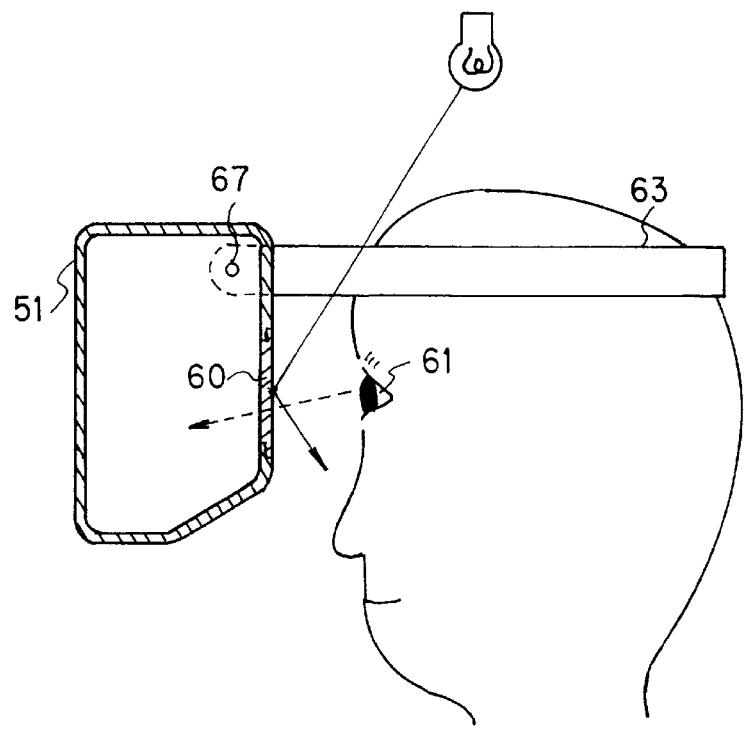
FIGS. 40A and 40B show a twelfth embodiment, in which the housing 51 is rotatable relative to the support 63.
Figure 40B:
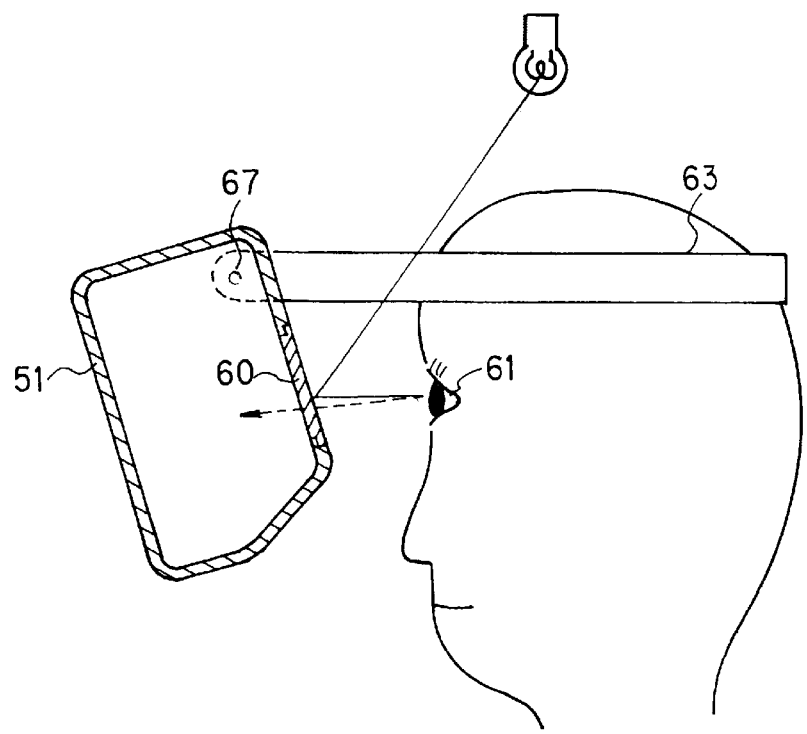

FIGS. 40A and 40B show a twelfth embodiment, in which the housing 51 is rotatable relative to the support 63. As shown, the support 63 has a pivotal support section 67 formed at its front end, and a rear upper portion of the housing 51 is pivotally supported on the pivotal support section 67. For the remainder of the structure, the embodiment is the same as the tenth embodiment.

With this arrangement, when the housing 51 is tilted as shown in FIG. 40B, light from an overhead illuminator may be reflected by the eyepiece window 60 to enter the pupils 61. In such a case the housing 51 is turned to its upright position as shown in FIG. 40A to prevent the external light form entering the pupils 61.

The housing 51 is tilted as shown in FIG. 40B in the case when it is desired to view the electronic subject video relaxedly with the inner electronic video display means tilted forwardly downward and also quickly view the neighborhood field underneath. The head-mounted video display may be used more conveniently by securing the housing 51 in the upright position thereof as shown in FIG. 40A and disposing the inner electronic video display means as shown in FIG. 38.

Figure 41:
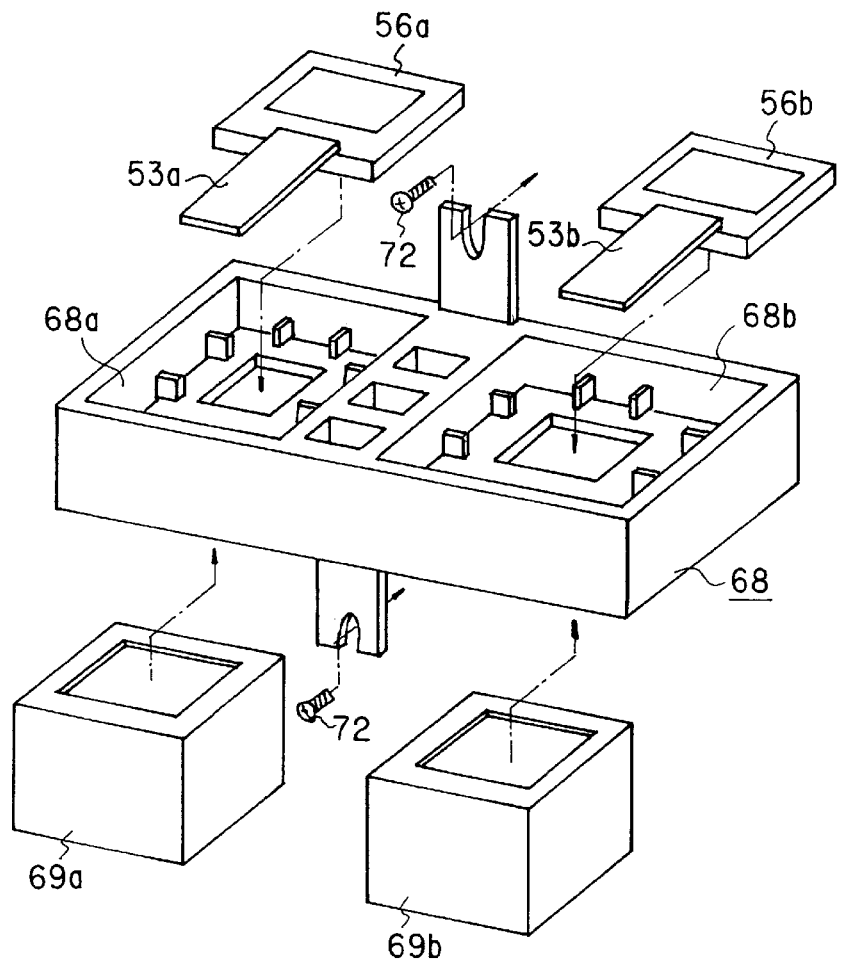
FIG. 41 shows a thirteenth embodiment. Specifically, the Figure is an exploded perspective view showing left and right LCDs 56a and 56b, optical system holding members 69a and 69b and a frame member 68.

FIG. 41 shows a thirteenth embodiment. Specifically, the Figure is an exploded perspective view showing left and right LCDs 56a and 56b, optical system holding members 69a and 69b and a frame member 68. The frame member 68 has recesses 68a and 68b, in which the LCDs 56a and 56b can be received to be secured. Left and right optical systems (not shown) are held by the optical system holding members 69a and 69b to be secured to the frame member 68, thus forming electronic video display means.

Figure 42:
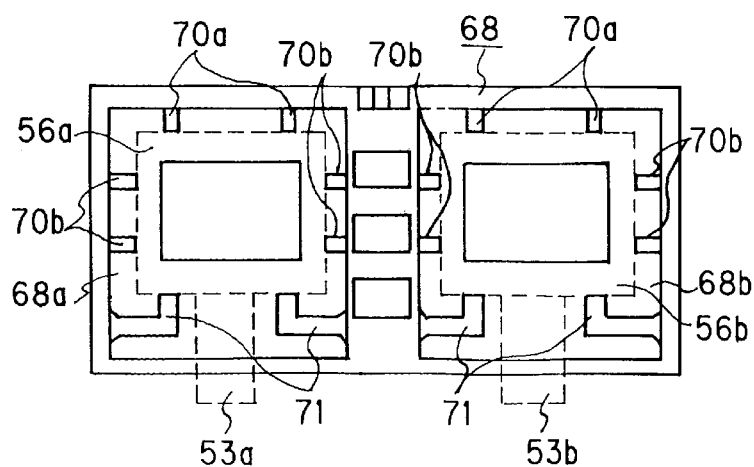
FIG. 42 shows, in plan view, the frame member 68.

FIG. 42 shows, in plan view, the frame member 68. In the recesses 68a and 68b, positioning pieces 70a and deviation prevention pieces 70b are provided. The left and right LCDs 56a and 56b, in which pushing members 71 are fitted, are secured in position by spring forces. The optical system holding members 69a and 69b with optical systems, are secured to the underside of the frame member 68. With this arrangement, video adjustment may be made, when it is found to be necessary after confirmation of video on the video display means, by moving the LCDs 56a and 56b or optical system holding means 69a and 69b relative to the frame member 68. This permits ready adjustment at the time of assembling. Afterwards, the assembly is mounted on the outer member of the display body with screws 72 (FIG. 41).

As shown, in this embodiment the electronic video display means comprising the LCDs and other components is mounted in the frame member 68 such that it is integral therewith, and it is possible to preclude deviation of video that might otherwise result from the lack of adequacy of the left and right electronic video display elements. In addition, because of the box-like structure of the frame member 68, it is possible to obtain weight reduction and of the frame member and increase the bending rigidity thereof in the vertical and horizontal directions.

Figure 43:
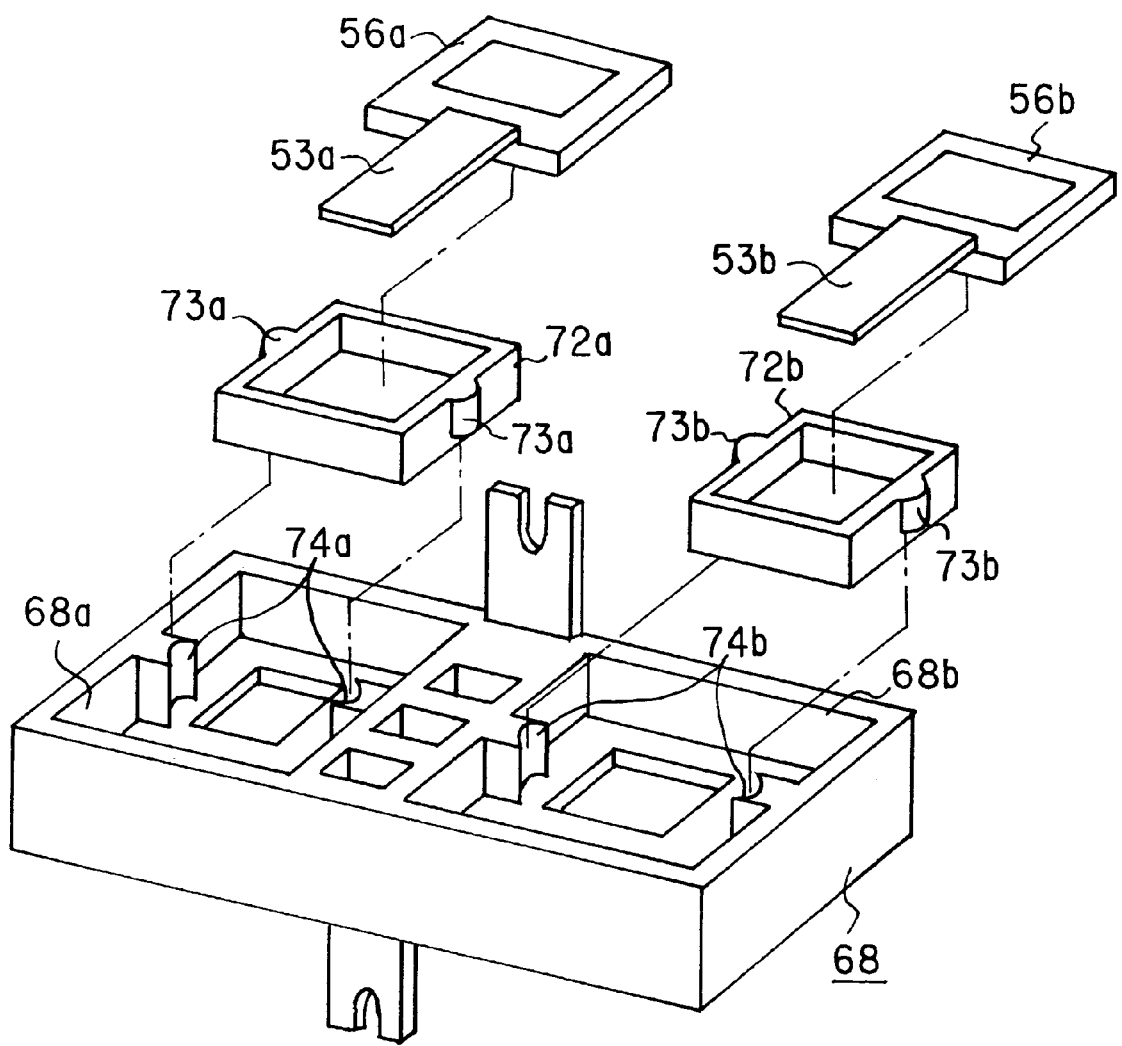
FIG. 43 shows a modification of the thirteenth embodiment.

FIG. 43 shows a modification of the thirteenth embodiment. In this embodiment, LCD frames 72a and 72b are provided for vertical movement in the recesses 68a and 68b of the frame member 68. To permit the vertical movement of the LCD frames 72a and 72b, the sides thereof are provided with protuberances 73a and 73b, while in the frame member 68 receiving portions 74a and 74b are formed in the recesses 68a and 68b. The LCD frames 72a and 72b are thus movable vertically with the receiving portions 74a and 74b as guides. With this vertical movement, the degrees of sight of the left and right eyes of the viewer are adjustable.

Figure 44:
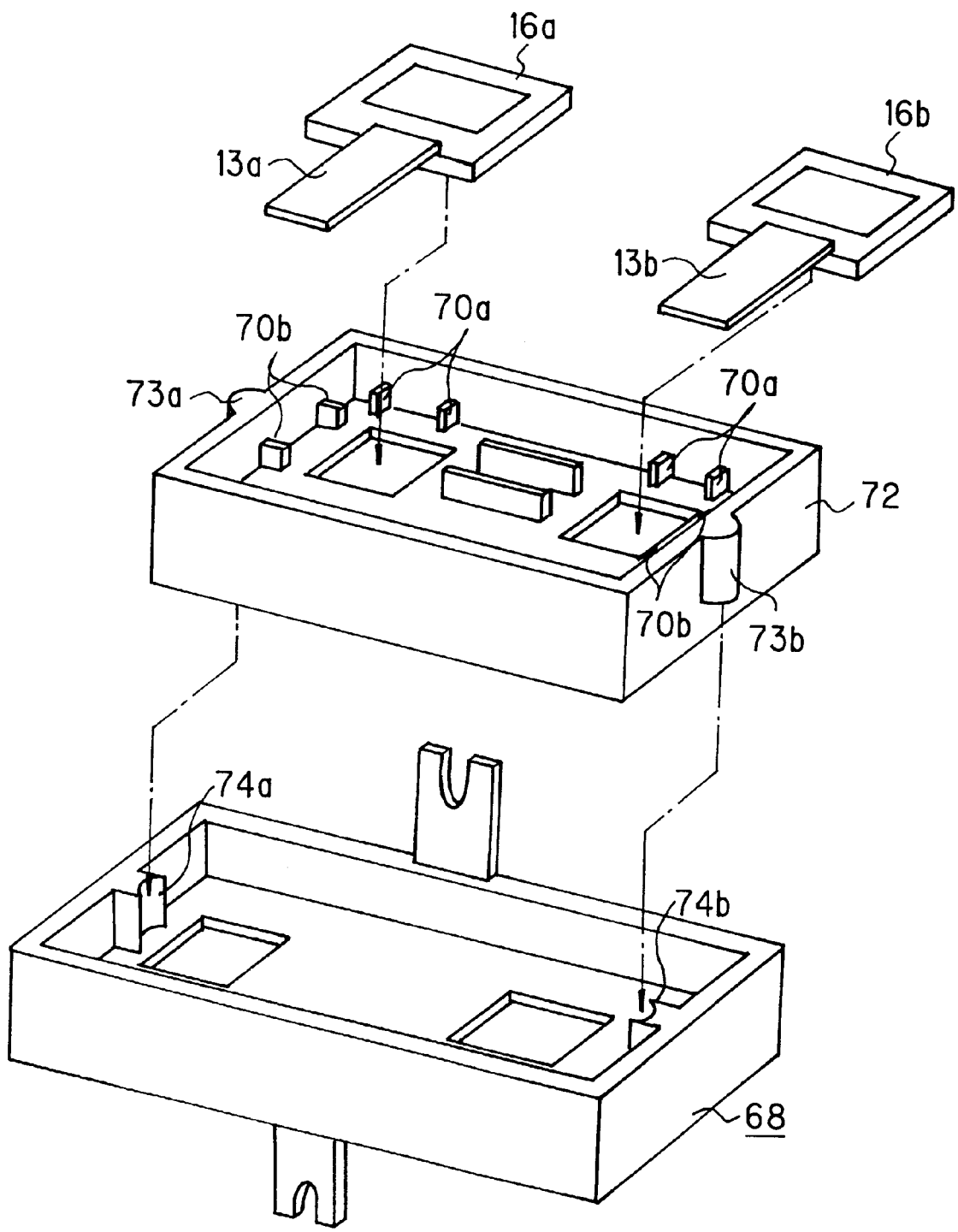
FIG. 44 shows another modification of the thirteenth embodiment.

FIG. 44 shows another modification of the thirteenth embodiment. In this embodiment, a single LCD frame 72 is used in lieu of the LCD frames 72a and 72b in the preceding modification. The LCD frame 72 is movable vertically relative to the frame member 68 with the receiving portions 74a and 84b as guides. The adjustment of the degrees of sight of the viewer thus can be done by causing vertical movement of the left and right LCDs 56a and 56b in unison with each other.

Figure 45:
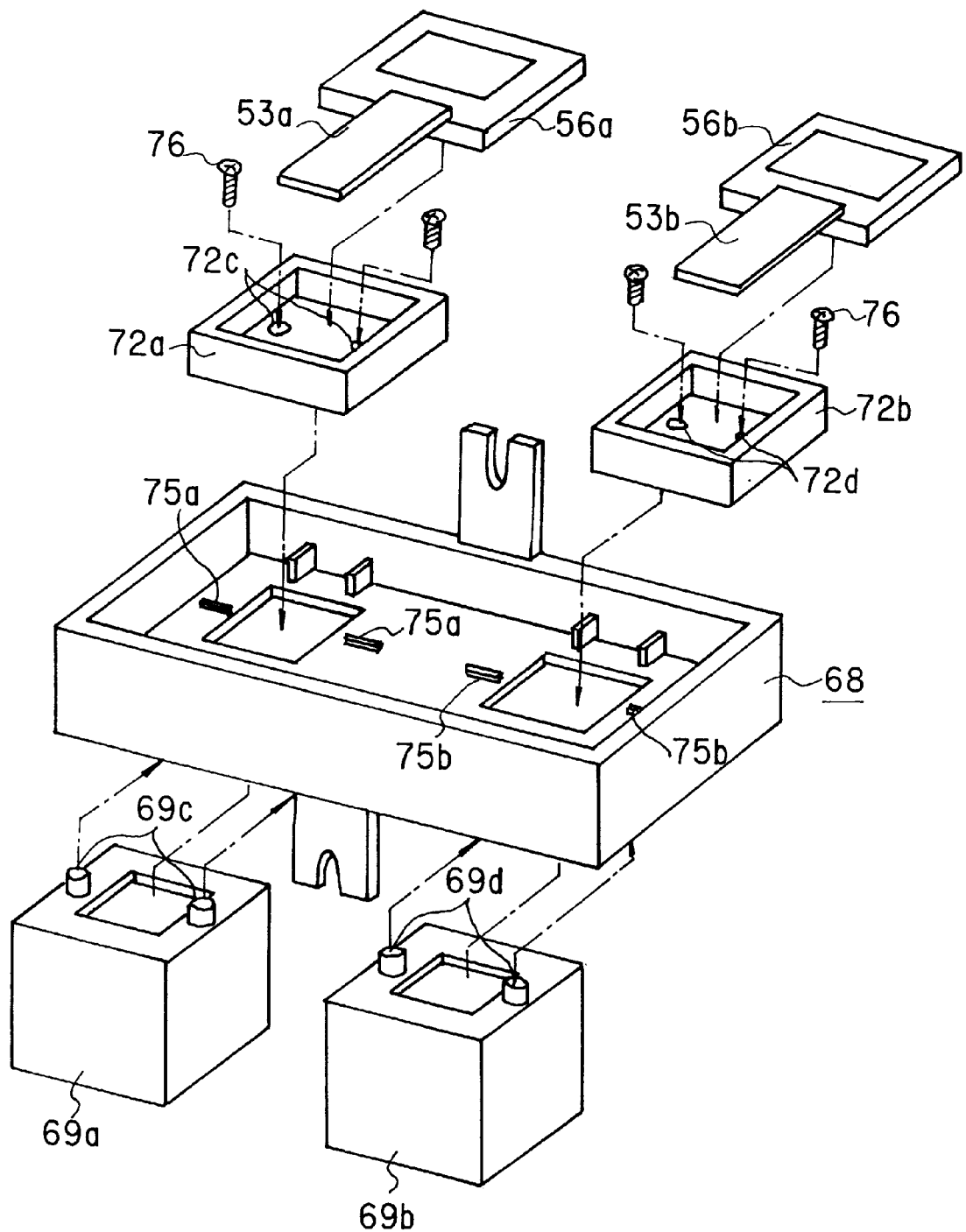
FIG. 45 shows a further modification of the thirteenth embodiment.

FIG. 45 shows a further modification of the thirteenth embodiment. In this modification, the frame member 68, in which the LCDs 72a and 72b supporting the LCDs 56a and 56b are disposed, has guide holes 75a and 75b elongate in its length direction. After the LCD frames 72a and 72b are placed in the frame member 68, bosses 69c and 69d provided on the top of the optical system holding members 69a and 69b are brought to the positions of the guide holes 75a and 75b. Then, screws 76 are inserted through mounting holes 72c formed in the LCD frames 72a and 72b, guide holes 75a and 75b and holes in the bosses 69c and 69d to secure together the individual components.

Figure 46:
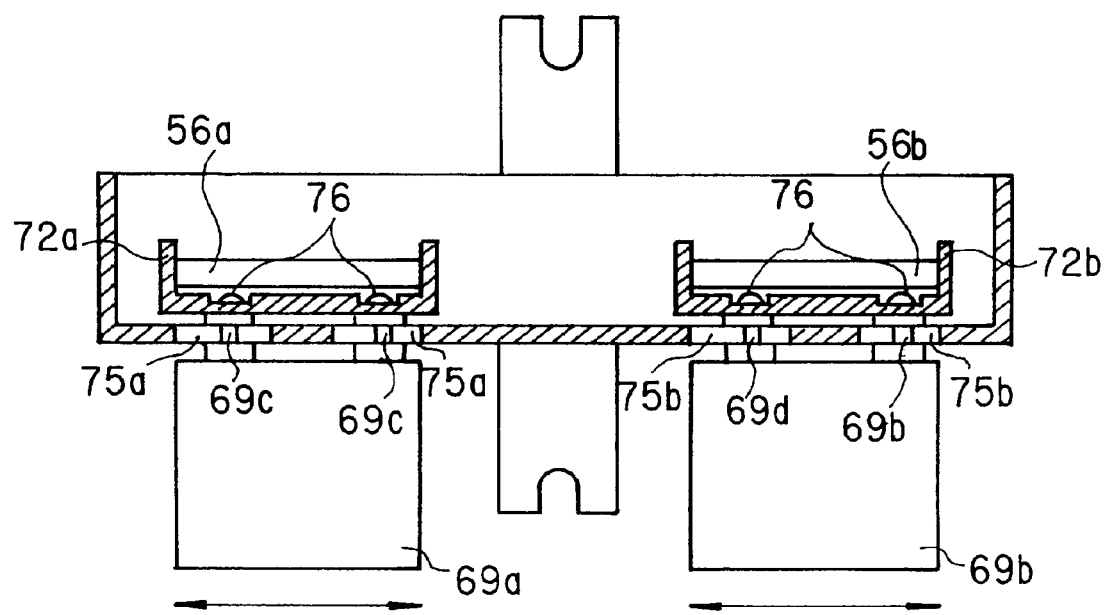
FIG. 46 is a sectional view of the LCD frames 72a and 72b and optical system holding members 69a and 69b, which are thus tentatively secured together.

FIG. 46 is a sectional view the LCD frames 72a and 72b and optical system holding members 69a and 69b, which are thus tentatively secured together. Since the guide holes 75a and 75b are elongate, the LCD frames 72a and 72b and optical system holding members 69a and 69b can be moved in the directions of arrows. Interpupillary distance adjustment thus can be done by bringing the LCD frames 72a and 72b and optical system holding members 69a and 69b to positions matched to the interpupillary distance of the viewer. After the adjustment, final securing may be done by tightening the screws 76.

Figure 47A:
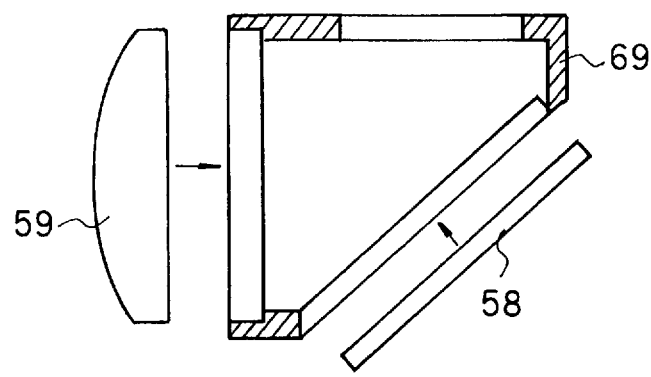
FIGS. 47A and 47B show, in a sectional view and an exploded perspective view, respectively, the manner of assembling optical elements in an optical system holding member.
Figure 47B:
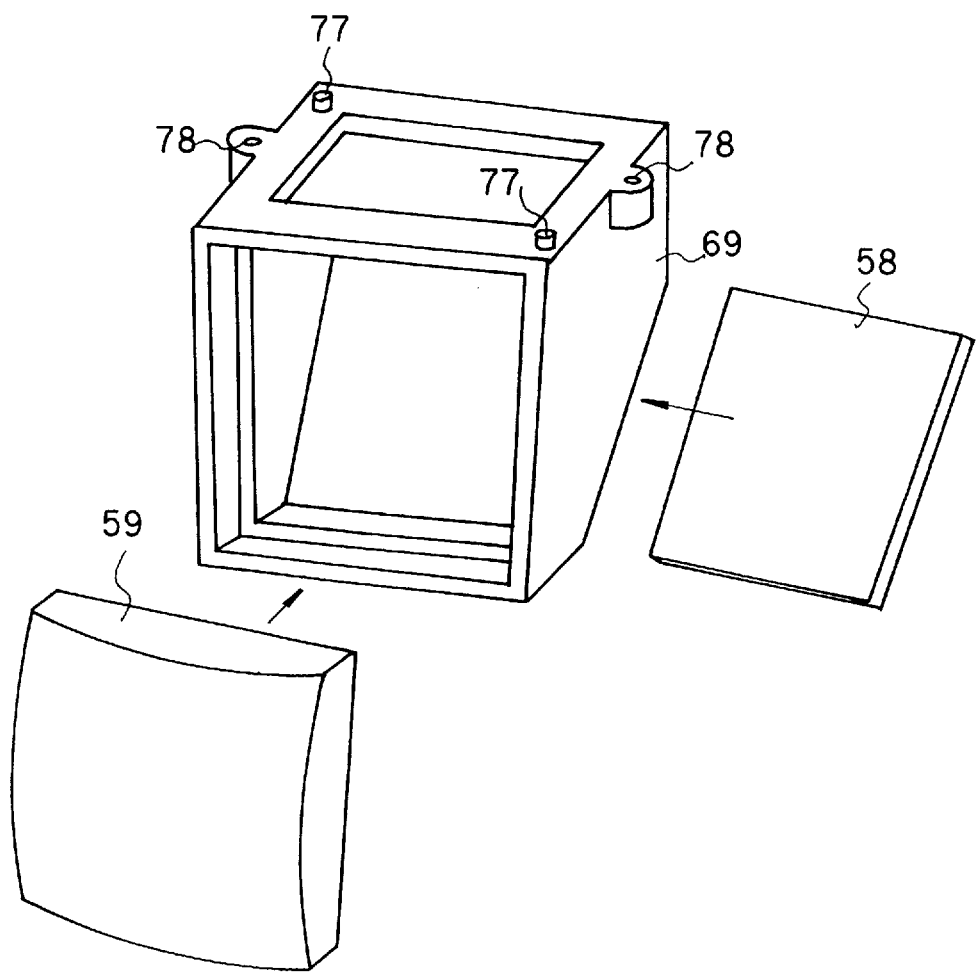

FIGS. 47A and 47B show, in a sectional view and an exploded perspective view, respectively, the manner of assembling optical elements in an optical system holding member. The optical system holding member 69 has its various walls as thin as possible for weight reduction of the system. Sufficient mechanical strength, therefore, can not be ensured with the sole optical system holding member 69. Sufficient mechanical strength of the optical system holding member 69 is provided by assembling a convex mirror 59, a half-mirror 58 and other optical elements with the holding member 69. With this arrangement, the rigidity of the optical system holding member with respect to longitudinal, transversal and torsional forces can be improved.

The optical system holding member 69 further has positioning bosses 77 and positioning threaded holes 78 for positioning a member to be mounted on it. It is possible to form the mounting threaded holes 78 like the bosses 69c and 69d of the optical system holding members 69a and 69d shown in FIG. 45 to permit interpupillary distance adjustment with respect to the mounted member as shown in FIG. 46. The convex mirror 59, half-mirror 58 and other optical elements may be made of a plastic material, glass or any other material.

As has been described in detail in the foregoing, according to the present invention the viewer basically can view an electronic subject video and, when desiring visual observation of the neighborhood field such as the surgical site of the patient, can do this by merely slightly turning down the line of sight. With the head-mounted video display, the viewer can view the electronic subject video under a relaxed condition by setting the video enlarging optical element to be at a downward angle of 3 to 10 degrees.

With the head-mounted video display in which the electronic video display elements and optical system holding members are secured to the frame member, it is possible to prevent deviation of video due to lack of adequacy of mounting of the left and right electronic video display elements.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A head-mounted video display apparatus for displaying an image to be observed by a user upon mounting the video display apparatus on the user's head, comprising:

a mounting member for mounting an electronic display assembly which includes a video display means therein on the head of the user;

an external light shielding member for shielding external light led from said video display means in a direction of arrival of the image displayed thereon; and a transparent guard member providing a visual field therethrough, said transparent guard member being secured to a predetermined portion of said electronic display assembly in a manner that said transparent guard member is positioned at an angle within 90 degrees from a downward direction normal to a line of an electronic video observation axis toward the user.

2. A head-mounted video display apparatus in accordance with claim 1, wherein the transparent guard member is provided with an anti-reflection means.

3. A head-mounted video display apparatus in accordance with claim 1, wherein the transparent guard is provided with an anti-charging means.

4. A head-mounted video display apparatus for displaying an image to be observed by both eyes of a user upon mounting the video display apparatus on the user's head, comprising:

a display assembly having a receptacle which includes a video display means therein; and a mounting member for mounting said display assembly on the user's head, wherein:

said receptacle of said display assembly is formed with a chamfered portion thereby offering an unbroken vista for observing outside therethrough.

5. A head-mounted video display apparatus in accordance with claim 4, wherein said chamfered portion is formed by a predetermined portion of said receptacle with an anti-reflection means provided on an inner surface thereof.

6. A head-mounted video display apparatus in accordance with claim 4, wherein said chamfered portion of said receptacle has outer protuberances for preventing light reflected by an outer surface of said chamfered portion from being incident on the eyes of said user.

7. A head-mounted video display apparatus for displaying an image to be observed by a user upon mounting the apparatus on the user's head, comprising:

a display assembly having a frame member for holding an optical member which corresponds to a video display means displaying an image to be observed; and a mounting member for mounting said display assembly on the user's head, wherein said frame member and said optical member are assembled in one piece so as to compose a rigid unit.

* * * * *